US010022817B2

(12) United States Patent
Maruko et al.

(10) Patent No.: US 10,022,817 B2
(45) Date of Patent: Jul. 17, 2018

(54) FRICTION STIR WELDING TOOL INCLUDING A DOVETAIL CONNECTION

(71) Applicant: FURUYA METAL CO., LTD., Tokyo (JP)

(72) Inventors: Tomohiro Maruko, Tokyo (JP); Tomoaki Miyazawa, Tokyo (JP); Yuichi Iwamoto, Tokyo (JP)

(73) Assignee: FURUYA METAL CO., LTD., Tokyo (JP)

(*) Notice: Subject to any disclaimer, the term of this patent is extended or adjusted under 35 U.S.C. 154(b) by 0 days.

(21) Appl. No.: 15/620,936

(22) Filed: Jun. 13, 2017

(65) Prior Publication Data
US 2017/0274472 A1 Sep. 28, 2017

Related U.S. Application Data

(62) Division of application No. 14/912,691, filed as application No. PCT/JP2014/071670 on Aug. 19, 2014.

(30) Foreign Application Priority Data

Aug. 21, 2013 (JP) .................. 2013-170997

(51) Int. Cl.
B23K 20/12 (2006.01)
(52) U.S. Cl.
CPC ................ B23K 20/1255 (2013.01)
(58) Field of Classification Search
CPC .................................. B23K 20/1255
(Continued)

(56) References Cited

U.S. PATENT DOCUMENTS 327,315 A 9/1885 Richardson
519,454 A * 5/1894 Holland ............. A61B 17/3213
175/420

(Continued)

FOREIGN PATENT DOCUMENTS

CN 101791747 A 8/2010
JP 2005-199281 A 7/2005
(Continued)

OTHER PUBLICATIONS

An Office Action issued by the U.S. Patent Office dated Oct. 6, 2017, which corresponds to U.S. Appl. No. 15/620,913 and is related to U.S. Appl. No. 15/620,936.

(Continued)

Primary Examiner — Erin B Saad
Assistant Examiner — Carlos J Gamino
(74) Attorney, Agent, or Firm — Studebaker & Brackett PC

(57) ABSTRACT

A tool for friction stir welding includes a tool part, a shank part and a cap part. The tool part and the shank part have a hexagonal frustum-shaped concave section and a hexagonal frustum-shaped convex section to enable movement of the tool part with respect to the shank part in a direction parallel to an axis of rotation while movement of the tool part with respect to the shank part in a direction around the axis of rotation is restricted, by the hexagonal frustum-shaped concave section and the hexagonal frustum-shaped convex section of the tool part and the shank part are fitted to each other. After the hexagonal frustum-shaped concave section and the hexagonal frustum-shaped convex section are fitted to each other, by the tool part and the shank part being covered by the cap part, the tool part is fixed to the shank part.

2 Claims, 32 Drawing Sheets

(58) Field of Classification Search
USPC .................................... 279/93, 94, 44, 45
See application file for complete search history.

(56) References Cited

U.S. PATENT DOCUMENTS

| | | | | |
|---|---|---|---|---|
| 608,902 | A * | 8/1898 | Pedersen | A61B 17/3213 |
| | | | | 279/44 |
| 718,306 | A * | 1/1903 | Boring | C03B 5/187 |
| | | | | 279/45 |
| 799,787 | A * | 9/1905 | Gessert | B23B 31/103 |
| | | | | 279/77 |
| 930,436 | A | 8/1909 | Thomas | |
| 2,393,424 | A | 1/1946 | Selch | |
| 2,482,603 | A * | 9/1949 | Toth | B23B 31/103 |
| | | | | 279/45 |
| 3,015,241 | A | 1/1962 | Konwal | |
| 3,217,572 | A * | 11/1965 | Ernst | B23Q 5/22 |
| | | | | 82/137 |
| 3,289,273 | A * | 12/1966 | Artaud | B23B 29/03 |
| | | | | 235/133 R |
| 3,859,699 | A * | 1/1975 | Lindskog | B23B 29/022 |
| | | | | 407/109 |
| 4,167,218 | A | 9/1979 | Horiuchi et al. | |
| 4,176,991 | A * | 12/1979 | Egli | B23B 31/103 |
| | | | | 279/33 |
| 4,682,916 | A | 7/1987 | Briese | |
| 4,828,436 | A | 5/1989 | Briese | |
| 5,769,577 | A * | 6/1998 | Boddy | B23B 29/046 |
| | | | | 408/197 |
| 5,957,631 | A * | 9/1999 | Hecht | B23B 51/00 |
| | | | | 408/144 |
| 6,138,895 | A | 10/2000 | Oelgoetz et al. | |
| 6,394,711 | B1 | 5/2002 | Brosius | |
| 6,666,613 | B2 * | 12/2003 | Wu | F21S 8/065 |
| | | | | 285/139.1 |
| 6,729,531 | B2 | 5/2004 | Stevenson et al. | |
| 7,097,398 | B2 * | 8/2006 | Hernandez, Jr. | B23B 51/08 |
| | | | | 279/14 |
| 7,152,509 | B2 | 12/2006 | McCalley, Jr. et al. | |
| 7,210,968 | B1 * | 5/2007 | Gister | H01R 4/44 |
| | | | | 439/668 |
| 7,290,968 | B1 | 11/2007 | Wu | |
| 7,677,427 | B2 | 3/2010 | Fukuhara et al. | |
| 8,840,347 | B2 * | 9/2014 | Aare | B23B 51/02 |
| | | | | 408/230 |
| 8,870,499 | B2 * | 10/2014 | Harif | B23B 27/12 |
| | | | | 407/102 |
| 8,919,823 | B2 * | 12/2014 | Hsiao | F24F 13/222 |
| | | | | 285/124.3 |
| 9,289,869 | B1 * | 3/2016 | Lelonek | B23Q 1/0081 |
| 9,381,621 | B2 * | 7/2016 | Taylor | B25B 1/2405 |
| 2002/0014516 | A1 | 2/2002 | Nelson et al. | |
| 2003/0201307 | A1 | 10/2003 | Waldron et al. | |
| 2005/0220551 | A1 | 10/2005 | Buettiker et al. | |
| 2006/0043152 | A1 | 3/2006 | Stol et al. | |
| 2006/0169740 | A1 | 8/2006 | Fukuhara et al. | |
| 2006/0169747 | A1 | 8/2006 | Tolle et al. | |
| 2006/0213954 | A1 | 9/2006 | Ruther et al. | |
| 2009/0095795 | A1 | 4/2009 | Hunt et al. | |
| 2009/0241301 | A1 | 10/2009 | Hunt et al. | |
| 2010/0108742 | A1 | 5/2010 | Stol et al. | |
| 2011/0268977 | A1 | 11/2011 | Kimura et al. | |
| 2011/0274943 | A1 | 11/2011 | Fujii et al. | |
| 2014/0217151 | A1 | 8/2014 | Miyahara et al. | |

FOREIGN PATENT DOCUMENTS

| | | |
|---|---|---|
| JP | 2006-212657 A | 8/2006 |
| JP | 2007-268605 A | 10/2007 |
| JP | 2008-030096 A | 2/2008 |
| JP | 2010-247183 A | 11/2010 |
| WO | 2013/027474 A1 | 2/2013 |

OTHER PUBLICATIONS

An Office Action issued by the U.S. Patent Office dated Jul. 26, 2017, which corresponds to U.S. Appl. No. 14/912,691 and is related to U.S. Appl. No. 15/620,936.

The First Office Action issued by the State Intellectual Property Office of People's Republic of China dated Jul. 25, 2017, which corresponds to Chinese Patent Application No. 201480046436.2 and is related to U.S. Appl. No. 15/620,936.

International Search Report; PCT/JP2014/071670, dated Nov. 25, 2014.

Written Opinion; PCT/JP2014/071670, dated Nov. 25, 2014.

International Preliminary Report on Patentability of the International Searching Authority; PCT/JP2014/071670, dated Feb. 23, 2016.

* cited by examiner

Fig.14
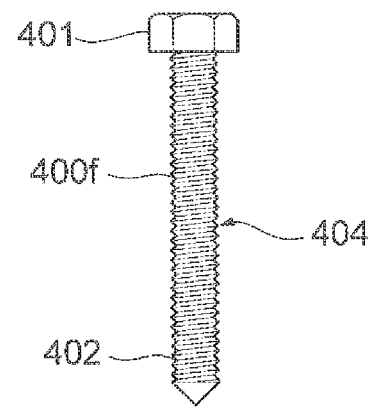
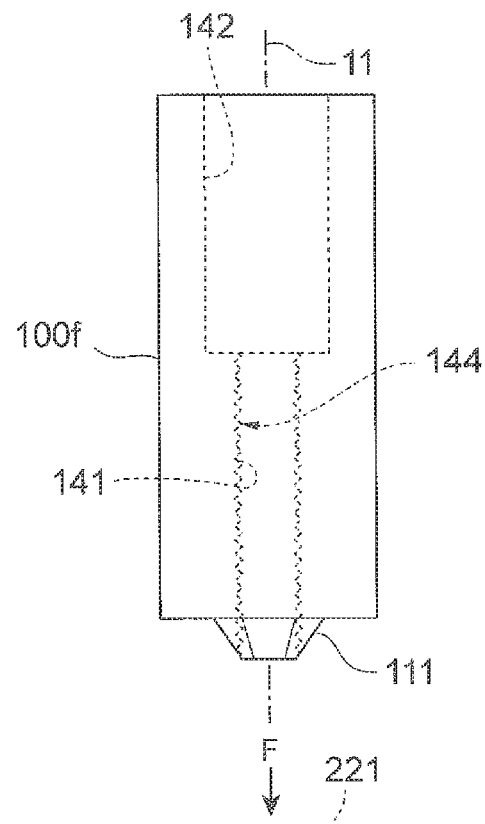
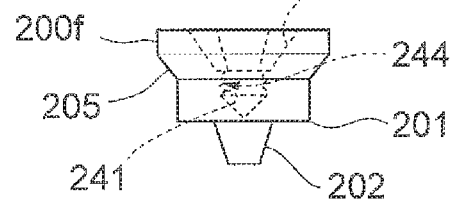

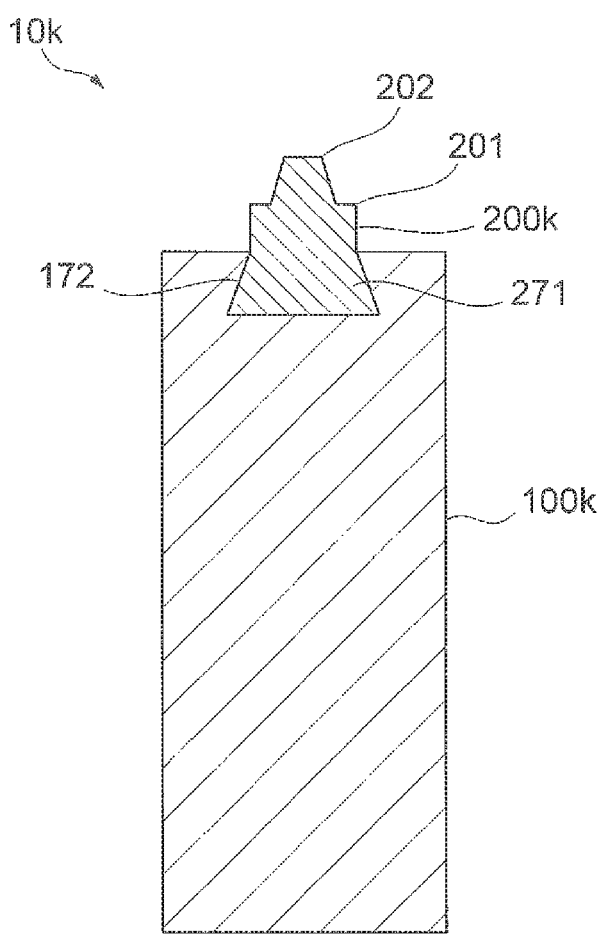

FRICTION STIR WELDING TOOL INCLUDING A DOVETAIL CONNECTION

CROSS REFERENCE TO RELATED APPLICATIONS

This application is a Divisional Application of U.S. patent application Ser. No. 14/912,691, filed Feb. 18, 2016, which is the U.S. National Phase Application of International Patent Application No. PCT/JP2014/071670, filed Aug. 19, 2014, which claims benefit of Japanese Patent Application No. 2013-170997, filed Aug. 21, 2013, the entire contents of which are incorporated herein by reference.

TECHNICAL FIELD

An aspect of the present invention relates to a tool for friction stir welding, and particularly, to a tool for friction stir welding including a tool part and a shank part having a front end to which the tool part is fixed.

BACKGROUND ART

In recent years, development of a technology of welding and repair using a friction stir effect is remarkable. Using friction stir welding, a large number of successful examples of welding that could not be performed in the welding of the related art, such as welding between high carbon steels, dissimilar welding of steel and Al alloy, welding between Ti and alloys thereof that requires a high vacuum level for welding, and so on, have been reported. Since friction stir welding is a technology in which Al is used as a target of a material to be welded at the beginning of development, a material that can be relatively easily available, for example, tool steel or the like, can be used for the tool that is used. For this reason, problems related to the tool are focused on a shape of a probe or a shoulder that exerts an influence on a joint, such as a plastic flow, stirring efficiency, or the like.

Meanwhile, in recent years, developments in friction stir welding have been remarkable in a technology of welding or repairing a steel material, a Ti-based alloy or a Ni alloy having a melting point about 1000° C. higher than that of Al. When these materials are welded or repaired, a tool having strength against high temperatures and good abrasion resistance is needed. Until now, tools having high performance at high temperatures such as ceramic-based tools obtained by sintering cBN (cubic boron nitride) or $Si_3N_4$ (silicon nitride), metal-based tools such as Ni-based alloys, Co-based alloys, Mo-based alloys, W-based alloys, Ir-based alloys, or the like, and so on, have been developed, and welding of metals having a high melting point come to be realize.

Since such a tool formed of an Ir-based alloy or the like is generally expensive, a technique of manufacturing only the tool that partially contributes to welding or repair and a holder configured to hold the tool using an inexpensive material and assembling the tool portion and the holder is employed. For example, in Patent Document 1, a tool for friction stir welding having a cutout as a locking section formed at a rear section side of the tool that is detachably attached to a shank part is disclosed. An accommodating section into which a rear section side of the tool having the locking section is inserted is formed in the shank part formed of tool steel or dies steel. As the rear section side of the tool is inserted into the accommodating section of the shank part and a screw that is screwed thereinto is pressed against the locking section of the tool inserted into the accommodating section from a side surface of the shank part, the tool is fixed to the shank part.

PRIOR ART DOCUMENTS

Patent Document

Patent Document 1: Japanese Published Unexamined Patent application, First Publication No. 2005-199281

SUMMARY OF INVENTION

Problems to be Resolved by the Invention

Incidentally, when the metal having a high melting point is welded, heat is transferred to not only the tool but also the holder that holds the tool, and further, high torsional stress is applied thereto. These become causes of burning and/or biting between the tool and the holder, and detachment of the tool may be difficult. In addition, when the tool and the holder are assembled by a method such as shrinkage fitting or the like, the fitting may become loose due to heating, and a rotational force from the holder fixed to a power source may not be sufficiently transmitted to the tool. In addition, the tool sometimes easily falls out of the holder too easily.

In this technical field, it is desired to provide a tool for friction stir welding capable of more reliably fixing a tool part to a shank part and easily detaching the tool part from the shank part.

Means of Solving the Problems

An aspect of the present invention is a tool for friction stir welding comprising: a tool part abutting a workpiece while being rotated; a shank part configured to fix the tool part to a front end of the shank part and be rotated together with the tool part; and a cap part configured to cover the tool part and the shank part, wherein portions in the tool part and the shank part at which the tool part and the shank part contact each other have at least one from between a convex section and a concave section, in order to enable movement of the tool part with respect to the shank part in a direction parallel to an axis of rotation of the shank part while movement of the tool part with respect to the shank part in a direction around the axis of rotation of the shank part is restricted, by the convex section and the concave section of the tool part and the shank part being fitted to each other, and after the convex section and the concave section of the tool part and the shank part are fitted to each other, the tool part is fixed to the front end of the shank part, by the tool part and the shank part being covered by the cap part.

According to the above-mentioned configuration, in the tool for friction stir welding, when the tool part is fixed to the shank part by the cap part, since movement of the tool part with respect to the shank part in the direction around the axis of rotation of the shank part is restricted by the convex section and the concave section that are fitted to each other and movement of the tool part with respect to the shank part in the direction parallel to the axis of rotation of the shank part is restricted by the cap part, it is possible to reliably prevent the tool part from being deviated with respect to the shank part in the direction around the axis of rotation of the shank part upon rotation of the shank part, fixation of the tool part and the shank part from being loosened, and the tool part from falling out of the shank part.

Meanwhile, when the cap part is detached, even when the convex section and the concave section are fitted to each other, since the tool part can move with respect to the shank part in the direction parallel to the axis of rotation of the shank part, the tool part can be easily detached from the shank part.

In addition, another aspect of the present invention is a tool for friction stir welding comprising: a tool part abutting a workpiece while being rotated; a shank part configured to fix the tool part to a front end of the shank part and be rotated together with the tool part; and a screw having a groove formed at its outer periphery thereof for fixing the tool part to the front end of the shank part, wherein portions in the tool part and the shank part at which the tool part and the shank part contact each other have at least one from between a convex section and a concave section, in order to enable movement of the tool part with respect to the shank part in a direction parallel to an axis of rotation of the shank part while movement of the tool part with respect to the shank part in a direction around the axis of rotation of the shank part is restricted, by the convex section and the concave section of the tool part and the shank part being fitted to each other, the shank part has a shank part hole section wherein the screw is capable of reaching the tool part fixed to the front end of the shank part passing through the shank part, the tool part has a tool part screw hole section having a groove, at an inner periphery, meshing with the groove of the outer periphery of the screw passing through the shank part hole section, and after the convex section and the concave section of the tool part and the shank part are fitted to each other, the tool part is fixed to the front end of the shank part, by the groove of the outer periphery of the screw passed through the shank part hole section meshing with the groove of the inner periphery of the tool part screw hole section.

According to the above-mentioned configuration, in the tool for friction stir welding, after the convex section and the concave section of the tool part and the shank part are fitted to each other, as the screw passing through the shank part hole section is screwed into the tool part screw hole section, since movement of the tool part with respect to the shank part in the direction around the axis of rotation of the shank part is restricted by the convex section and the concave section that are fitted to each other, the groove of the outer periphery of the screw is meshed with the groove of the inner periphery of the tool part screw hole section and the tool part is pulled and fixed to the shank part.

Since movement of the tool part with respect to the shank part in the direction around the axis of rotation of the shank part is restricted by the convex section and the concave section that are fitted to each other and movement of the tool part with respect to the shank part in the direction parallel to the axis of rotation of the shank part is restricted by the screw, it is possible to reliably prevent the tool part from being deviated with respect to the shank part in the direction around the axis of rotation of the shank part upon rotation of the shank part, fixation of the tool part and the shank part from being loosened, and the tool part from falling out of the shank part.

Meanwhile, in a state in which movement of the screw in the direction parallel to the axis of rotation of the shank part is restricted, as the screw is rotated away from the tool part screw hole section, while movement of the tool part with respect to the shank part in the direction around the axis of rotation of the shank part is restricted by the convex section and the concave section that are fitted to each other, since the tool part can move with respect to the shank part in the direction parallel to the axis of rotation of the shank part, the groove of the outer periphery of the screw is meshed with the groove of the inner periphery of the tool part screw hole section, and the tool part is detached from the shank part by applying the force in the direction away from the shank part. Accordingly, the tool part can be easily detached from the shank part.

In this case, the tool may have a groove with an inner diameter larger than an inner diameter of the tool part screw hole section in an inner periphery of the shank part hole section, and the groove may be capable of screwing in a tool part detachment screw having a groove on its outer periphery meshing with the groove of the inner periphery of the shank part hole section.

According to the above-mentioned configuration, as the groove having a larger diameter than the tool part screw hole section is formed in the shank part hole section and the tool part detachment screw having a diameter set to be meshed with the groove is screwed thereinto, the tool part is pushed out. Accordingly, the tool part can be easily detached from the shank part.

In addition, the groove of the outer periphery of the screw and the groove of the inner periphery of the tool part screw hole section may be formed such that the screw moves in an inward direction of the tool part screw hole section when the screw is rotated in the same direction as the rotational direction of the shank part.

According to the above-mentioned configuration, upon rotation of the shank part, since the force is applied in the direction in which the screw moves in the inward direction of the tool part screw hole section, it is possible to more effectively prevent fixation of the tool part and the shank part from being loosened and the tool part from falling out of the shank part as the screw is loosened.

In addition, the convex section may be a shape protruding in either a polygonal conical shape or a polygonal frustum shape, and the concave section may be a shape recessed in either a polygonal conical shape or a polygonal frustum shape.

According to the above-mentioned configuration, the tool part can easily move with respect to the shank part in the direction parallel to the axis of rotation of the shank part while restricting movement of the tool part with respect to the shank part in the direction around the axis of rotation of the shank part due to the simple shape.

In addition, the convex section may be a protruding shape as a key, and the concave section may have a recessed shape as a key groove.

According to the above-mentioned configuration, the tool part can easily move with respect to the shank part in the direction parallel to the axis of rotation of the shank part while securely restricting movement of the tool part with respect to the shank part in the direction around the axis of rotation of the shank part due to the simple shape.

In addition, the convex section may have a serrated shape including a surface parallel to the axis of rotation of the shank part and perpendicular to the direction around the axis of rotation, and the concave section may have a serrated shape including a surface parallel to the axis of rotation of the shank part and perpendicular to a direction around the axis of rotation.

According to the above-mentioned configuration, as the surfaces perpendicular to the direction around the axis of rotation abut each other, the tool part can move with respect to the shank part in the direction parallel to the axis of rotation of the shank part while securely restricting movement of the tool part with respect to the shank part in the direction around the axis of rotation of the shank part.

In addition, the convex section may have a serrated shape including a surface parallel to the axis of rotation of the shank part and perpendicular to a direction around the axis of rotation, and the concave section may have a serrated shape including a surface parallel to the axis of rotation of the shank part and perpendicular to the direction around the axis of rotation, and the tool may be further provided with a nut having a groove at its inner periphery meshing with the groove of the outer periphery of the screw, the nut having an outer diameter larger than an inner diameter of the shank part hole section, wherein the screw passes through the nut while the groove of the outer periphery of the screw and the groove of the inner periphery of the nut are meshed with each other, the convex section and the concave section of the tool part and the shank part are fitted to each other, and after the groove of the outer periphery of the screw passing through the shank part hole section is meshed with the groove of the inner periphery of the tool part screw hole section, in a state in which the shank part is disposed between the tool part and the nut, the tool part may be fixed to the front end of the shank part by the nut being rotated in a direction in which the nut and the tool part approach each other, and the tool part may be detached from the front end of the shank part by the screw being rotated in a direction in which surfaces perpendicular to the direction around the axis of rotation of the serrated shapes fitted to each other separate from each other, after the nut is rotated in a direction in which the nut and the tool part recede from each other.

In the above-mentioned configuration, as the screw is screwed into the tool part through the shank part to fasten the nut, the tool part is reliably fixed to the front end of the shank part, and then the nut is loosened to rotate the screw, the serrated inclined surface of the tool part and the serrated inclined surface of the shank part slide in opposite directions, and the tool part is detached from the shank part by applying the force in the direction away from the shank part. Accordingly, the tool part can be detached from the shank part.

In addition, in the case that the convex section has a serrated shape including a surface parallel to the axis of rotation of the shank part and perpendicular to a direction around the axis of rotation, and the concave section has a serrated shape including a surface parallel to the axis of rotation of the shank part and perpendicular to the direction around the axis of rotation, after the screw is removed from the tool part screw hole section and the shank part hole section, a tool part detachment screw having a groove at its outer periphery meshing with the groove of the inner periphery of the tool part screw hole section passes through the shank part hole section, and the groove of the outer periphery of the tool part detachment screw is meshed with the groove of the inner periphery of the tool part screw hole section, and the tool part may be detached from the front end of the shank part by the tool part detachment screw being rotated in a direction in which surfaces perpendicular to the direction around the axis of rotation of the serrated shapes fitted to each other separate from each other.

In the above-mentioned configuration, as the screw is screwed into the shank part and the tool part, the tool part can be reliably fixed to the front end of the shank part. Then, as the screw is detached from the shank part, the tool part detachment screw is screwed into the tool part screw hole section through the shank part hole section and the screw is further rotated, the serrated inclined surface of the tool part and the serrated inclined surface of the shank part slide together, and the tool part is detached from the shank part by applying the force in the direction separating from the shank part. Accordingly, the tool part can be easily detached from the shank part.

In addition, another aspect of the present invention is a tool for friction stir welding comprising: a tool part abutting a workpiece while being rotated; a shank part configured to fix the tool part to a front end of the shank part and be rotated together with the tool part; and a sliding restriction member fixed to a portion at which the tool part and the shank part contact each other, wherein a portion of the tool part and the shank part in which the tool part and the shank part contact each other have at least one from between a dovetail-shaped section protruding in a trapezoidal shape and a dovetail groove section recessed in a trapezoidal shape, the dovetail-shaped section protruding in a trapezoidal shape and the dovetail groove section recessed in a trapezoidal shape enabling slide movement of the tool part with respect to the shank part in a direction perpendicular to an axis of rotation of the shank part while movement of the tool part with respect to the shank part in a direction parallel to the axis of rotation of the shank part is restricted by the dovetail-shaped section and the dovetail groove section of the tool part and the shank part being fitted to each other, and after the dovetail-shaped section and the dovetail groove section of the tool part and the shank part are fitted to each other, the tool part is fixed to the front end of the shank part so as to restrict slide movement of the tool part with respect to the shank part in the direction perpendicular to the axis of rotation of the shank part, by the sliding restriction member being fixed to the portion at which the tool part and the shank part contact each other.

According to the above-mentioned configuration, when the sliding restriction member is fixed to the portion at which the tool part and the shank part come in contact with each other, since movement of the tool part with respect to the shank part in the direction parallel to the axis of rotation of the shank part by the dovetail-shaped section and the dovetail groove section that are fitted to each other and sliding movement of the tool part with respect to the shank part in the direction perpendicular to the axis of rotation of the shank part is restricted by the sliding restriction member, upon rotation of the shank part, it is possible to reliably prevent fixation of the tool part and the shank part from being loosened and the tool part from falling out of the shank part. Meanwhile, when the sliding restriction member is detached, even when the dovetail-shaped section and the dovetail groove section are fitted to each other, since the tool part can move with respect to the shank part in the direction perpendicular to the axis of rotation of the shank part, the tool part can be easily detached from the shank part.

In this case, the tool may further comprise a detachment member receiving section capable of having attached thereto a detachment member for applying a force such that the tool part slides with respect to the shank part in the direction perpendicular to the axis of rotation of the shank part when the dovetail-shaped section and the dovetail groove section of the tool part and the shank part are fitted to each other and the sliding restriction member is not fixed to the portion at which the tool part and the shank part contact each other.

According to the above-mentioned configuration, as the detachment member is attached to the detachment member receiving section and a force is applied by the detachment member such that the tool part slides with respect to the shank part in the direction perpendicular to the axis of rotation of the shank part, even when the tool part is hard to remove, the tool part can be easily detached from the shank part.

Advantageous Effects of the Invention

According to the tool for friction stir welding of the above-mentioned aspects and other aspects of the present invention, loosening of fixation between the tool part and the shank part and removal of the tool part from the shank part can be reliably prevented, and the tool part can be easily detached from the shank part.

BRIEF DESCRIPTION OF THE DRAWINGS

FIG. 14 is a side view showing a screw, a shank part and a tool part according to a sixth embodiment.

FIG. 32 is a cross-sectional view taken along line L-L of FIG. 31.

DESCRIPTION OF SPECIFIC EMBODIMENTS

Figure 1:
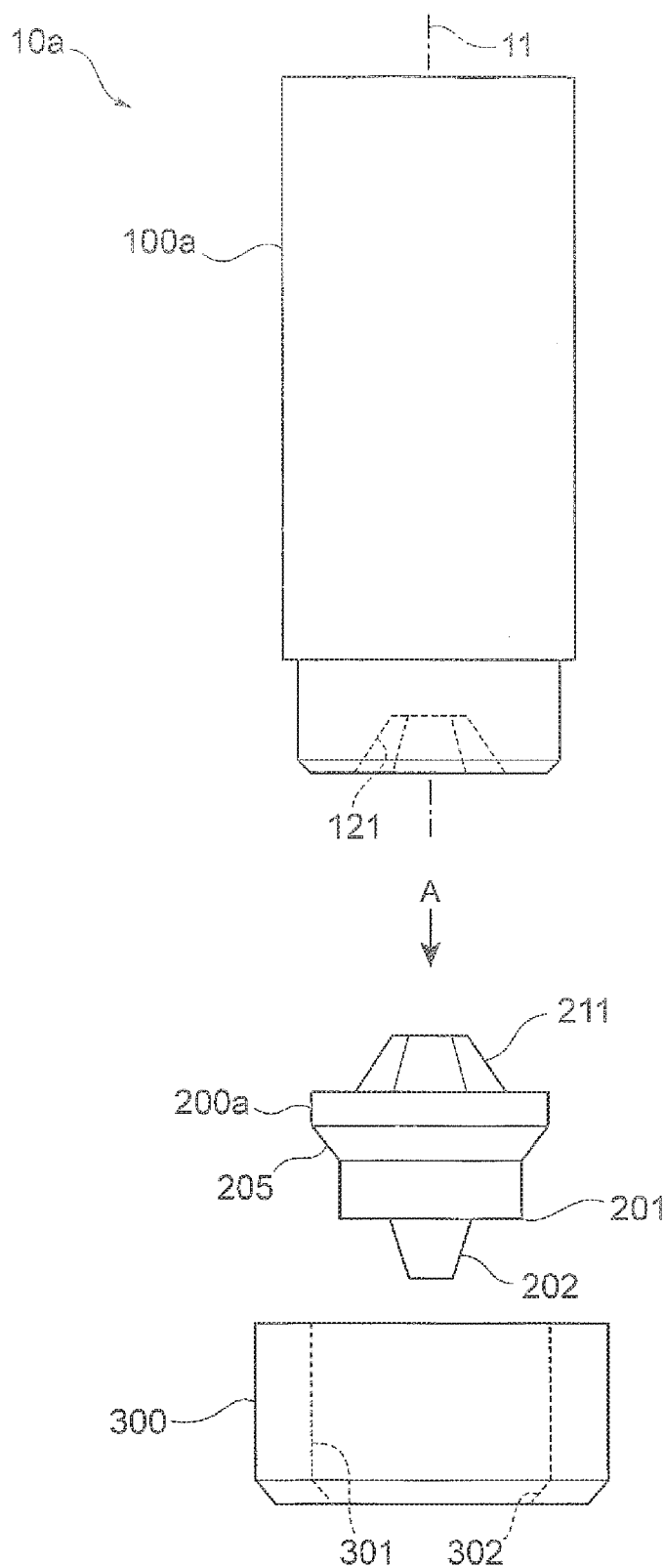
FIG. 1 is a side view showing a shank part, a tool part and a cap part according to a first embodiment.

Hereinafter, preferred embodiments of the present invention will be described in detail with reference to the accompanying drawings. As shown in FIG. 1, a tool for friction stir welding 10*a* according to a first embodiment of the present invention includes a shank part 100*a*, a tool part 200*a* and a cap part 300.

The shank part 100*a* has a columnar shape as a whole. The shank part 100*a* fixes the tool part 200*a* to a front end thereof at a lower end in FIG. 1, and is rotated about an axis of rotation 11 by a power source (not shown) together with the tool part 200*a*. The shank part 100*a* can be manufactured using a relatively inexpensive material such as tool steel or the like. A screw hole section configured to fix the cap part 300 using a screw may be formed at a circumferential edge or an outer periphery of the front end of the shank part 100*a*. Alternatively, a groove configured to fix the cap part 300 may be formed in the outer periphery of the front end of the shank part 100*a*.

The tool part 200*a* is fixed to the front end of the shank part 100*a*, and abuts a workpiece while rotating. The tool part 200*a* has a columnar shoulder 201 protruding from a conical frustum or columnar base section 205 at the front end portion abutting the workpiece. While the base section 205 will be described using a conical frustum base section in FIG. 1 and the other embodiments described below, the base section may be various modified to a shape such as a columnar shape or the like. A conical frustum probe 202 having a bottom surface with a smaller diameter than the shoulder 201 protrudes from a center of the front end of the shoulder 201. When the workpiece having a high melting point and formed of a steel material, a Ti-based alloy, a Ni alloy, or the like, is welded, the tool part 200*a* is manufactured using an Ir-based alloy or the like. In the embodiment, since the tool part 200*a* has a minimum size that enables the friction stir welding, even when the tool part is manufactured using a relatively expensive material such as an Ir alloy or the like, manufacturing cost can be reduced.

The cap part 300 has a cylindrical shape as a whole. The cap part 300 may be manufactured using a relatively inexpensive material such as tool steel or the like. The cap part 300 has a cap part inner surface 301. The cap part inner surface 301 has a shape corresponding to a shape of the front end of the shank part 100a. The cap part inner surface 301 has a reduced diameter section 302 having an inner diameter reduced at the end portion. The reduced diameter section 302 has a shape corresponding to a shape of the conical frustum or columnar base section 205 of the tool part 200a, and an inner diameter smaller than the outer diameter of the conical frustum or columnar base section 205 and equal to or larger than the outer diameter of the shoulder 201. A hole section corresponding to a screw hole section of the shank part 100a may be formed in the cap part 300 to be fixed to the front end of the shank part 100a. Alternatively, in order to fix the cap part to the front end of the shank part 100a, a groove corresponding to the groove formed in the outer periphery of the front end of the shank part 100a may be formed in the cap part inner surface 301.

A hexagonal frustum-shaped concave section 121 recessed in a hexagonal frustum shape is formed in the front end of the shank part 100a. The side surface of the hexagonal frustum-shaped concave section 121 is inclined toward the axis of rotation 11 of the shank part 100a while reaching the inside of the shank part 100a from the front end of the shank part 100a. Further, the hexagonal frustum-shaped concave section 121 is not limited to the hexagonal frustum shape but may have shapes of a quadrangular pyramid, an octagonal pyramid or other polygonal pyramids, and a quadrangular frustum, an octagonal frustum or other polygonal frustums.

Figure 2:
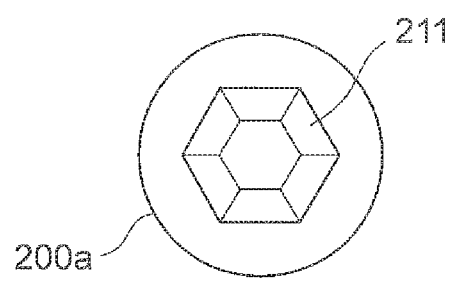
FIG. 2 is a plan view of the tool part of FIG. 1 when seen from a direction of an arrow A.

As shown in FIGS. 1 and 2, a hexagonal frustum-shaped convex section 211 corresponding to a shape of the hexagonal frustum-shaped concave section 121 of the shank part 100a is formed at a portion of the base section 205 of the tool part 200a that comes in contact with the shank part 100a. The side surface of the hexagonal frustum-shaped convex section 211 is inclined toward the axis of rotation 11 of the shank part 100a that serves as an axis of rotation of the tool part 200a as separated from the base section 205 of the tool part 200a. Further, the hexagonal frustum-shaped convex section 211 is not limited to the hexagonal frustum shape but may have shapes of a quadrangular pyramid, an octagonal pyramid or other polygonal pyramids, and a quadrangular frustum, an octagonal frustum or other polygonal frustums.

Hereinafter, an action of the tool for friction stir welding 10a of the embodiment will be described. When the friction stir welding is performed using the tool for friction stir welding 10a, the hexagonal frustum-shaped concave section 121 of the shank part 100a and the hexagonal frustum-shaped convex section 211 of the tool part 200a are fitted to each other. Since both of the hexagonal frustum-shaped concave section 121 and the hexagonal frustum-shaped convex section 211 have a hexagonal frustum shape, movement of the tool part 200a with respect to the shank part 100a in a direction parallel to the axis of rotation 11 of the shank part 100a becomes possible while movement of the tool part 200a with respect to the shank part 100a in a direction around the axis of rotation 11 of the shank part 100a is restricted.

In a state in which the hexagonal frustum-shaped concave section 121 and the hexagonal frustum-shaped convex section 211 are fitted to each other, as the front end of the shank part 100a and the base section 205 of the tool part 200a are covered by the cap part 300 attached to the shank part 100a, the tool part 200a is fixed to the front end of the shank part 100a. Here, the shoulder 201 and the probe 202 of the tool part 200a are exposed from the cap part 300. In this way, the friction stir welding can be performed in a state in which the tool part 200a is fixed to the front end of the shank part 100a. When the tool part 200a is detached from the shank part 100a, as the cap part 300 is detached from the shank part 100a and the tool part 200a, the tool part 200a can be easily detached from the shank part 100a. Further, application of a release agent such as BN or the like to the hexagonal frustum-shaped concave section 121, the hexagonal frustum-shaped convex section 211 and the cap part inner surface 301 that come in contact with each other is effective to prevent burning.

According to the embodiment, the tool for friction stir welding 10a includes the tool part 200a abutting the workpiece while rotating, the shank part 100a having the front end to which the tool part 200a is fixed and rotated together with the tool part 200a, and the cap part 300 configured to cover the tool part 200a and the shank part 100a. The hexagonal frustum-shaped concave section 121 and the hexagonal frustum-shaped convex section 211 are provided at portions of the tool part 200a and the shank part 100a at which the tool part 200a and the shank part 100a come in contact with each other, such that the tool part 200a can move with respect to the shank part 100a in the direction parallel to the axis of rotation of the shank part 100a while movement of the tool part 200a with respect to the shank part 100a in the direction around the axis of rotation 11 of the shank part 100a is restricted as the tool part and the shank part are fitted to each other. After the hexagonal frustum-shaped concave section 121 and the hexagonal frustum-shaped convex section 211 of the tool part 200a and the shank part 100a are fitted to each other, as the tool part 200a and the shank part 100a are covered by the cap part 300, the tool part 200a is fixed to the front end of the shank part 100a.

For this reason, when the tool part 200a is fixed to the shank part 100a by the cap part 300, since movement of the tool part 200a with respect to the shank part 100a in the direction around the axis of rotation 11 of the shank part 100a is restricted by the hexagonal frustum-shaped concave section 121 and the hexagonal frustum-shaped convex section 211 that are fitted to each other and movement of the tool part 200a with respect to the shank part 100a in the direction parallel to the axis of rotation 11 of the shank part 100a is restricted by the cap part 300, it is possible to reliably prevent the tool part 200a from being deviated with respect to the shank part 100a in the direction around the axis of rotation 11 of the shank part 100a upon rotation of the shank part 100a, fixation of the tool part 200a and the shank part 100a from being loosened, or the tool part 200a from falling out of the shank part 100a.

Meanwhile, when the cap part 300 is detached, even though the hexagonal frustum-shaped concave section 121 and the hexagonal frustum-shaped convex section 211 are fitted to each other, since the tool part 200a can move with respect to the shank part 100a in the direction parallel to the axis of rotation 11 of the shank part 100a, the tool part 200a can be easily detached from the shank part 100a.

In addition, in the embodiment, the hexagonal frustum-shaped concave section 121 is recessed in a hexagonal frustum shape, and the hexagonal frustum-shaped convex section 211 protrudes in a hexagonal frustum shape. For this reason, the tool part 200a can be easily moved with respect to the shank part 100a in the direction parallel to the axis of rotation 11 of the shank part 100a while restricting movement of the tool part 200a with respect to the shank part 100a in the direction around the axis of rotation 11 of the shank part 100a due to the simple shape. In addition, in the embodiment, since the hexagonal frustum-shaped convex section 211 protrudes from the tool part 200a abutting the workpiece and a length of the tool part 200a along the axis of rotation 11 is increased, strength of the tool part 200a can be improved.

Figure 3:
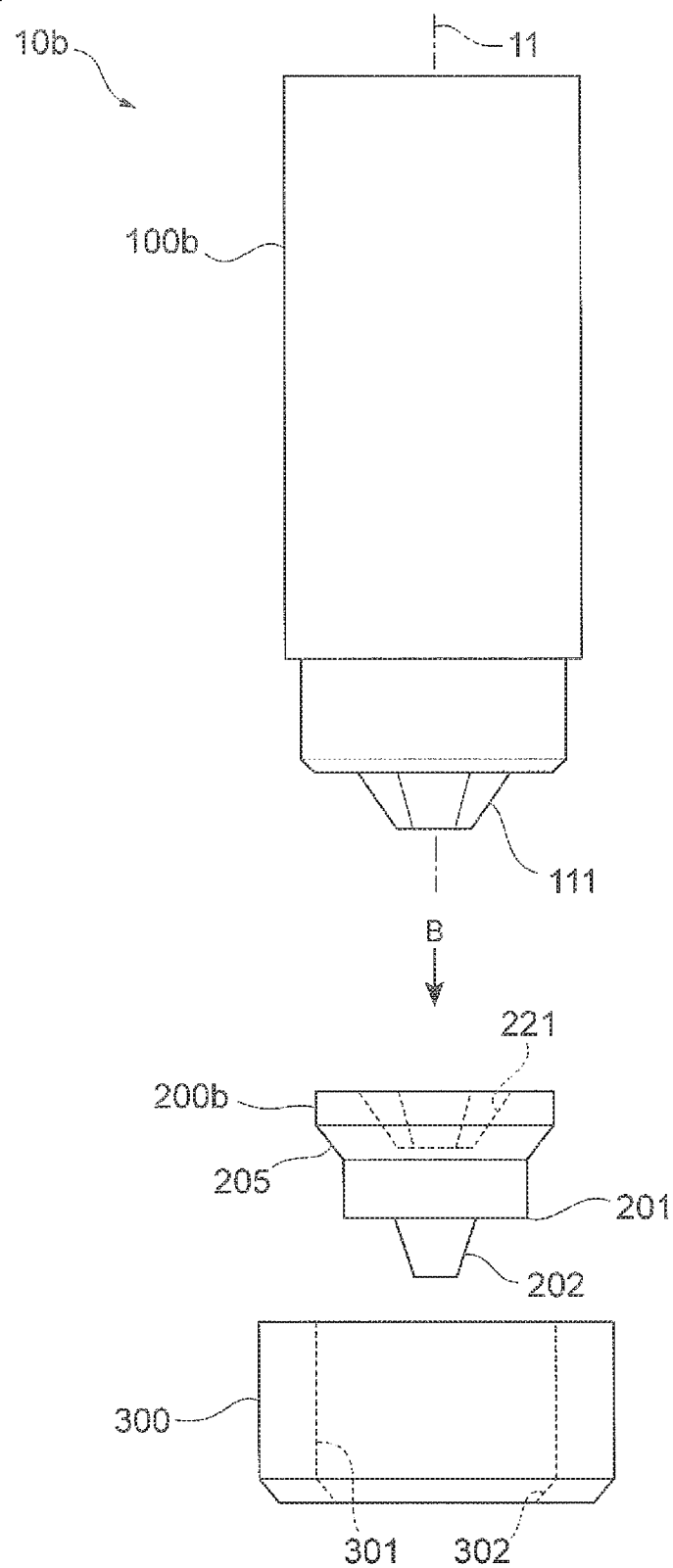
FIG. 3 is a side view showing a shank part, a tool part and a cap part according to a second embodiment.
Figure 4:
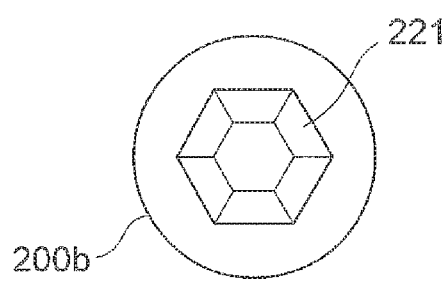
FIG. 4 is a plan view of the tool part of FIG. 3 when seen from a direction of an arrow B.

Hereinafter, a second embodiment of the present invention will be described. As shown in FIGS. 3 and 4, a tool for friction stir welding 10b of the embodiment is distinguished from the first embodiment in that the same hexagonal frustum-shaped convex section 111 as the hexagonal frustum-shaped convex section 211 of the tool part 200a of the first embodiment is provided at a shank part 100b and the same hexagonal frustum-shaped concave section 221 as the hexagonal frustum-shaped concave section 121 of the shank part 100a of the first embodiment is provided at a tool part 200b. The other configurations and actions of the tool for friction stir welding 10b are the same as the first embodiment.

In the embodiment, since the hexagonal frustum-shaped concave section 221 is recessed in the tool part 200b abutting the workpiece, even when the tool part is manufactured using a relatively expensive material such as an Ir alloy or the like, manufacturing cost can be reduced while reducing an amount of the material used.

Figure 5:
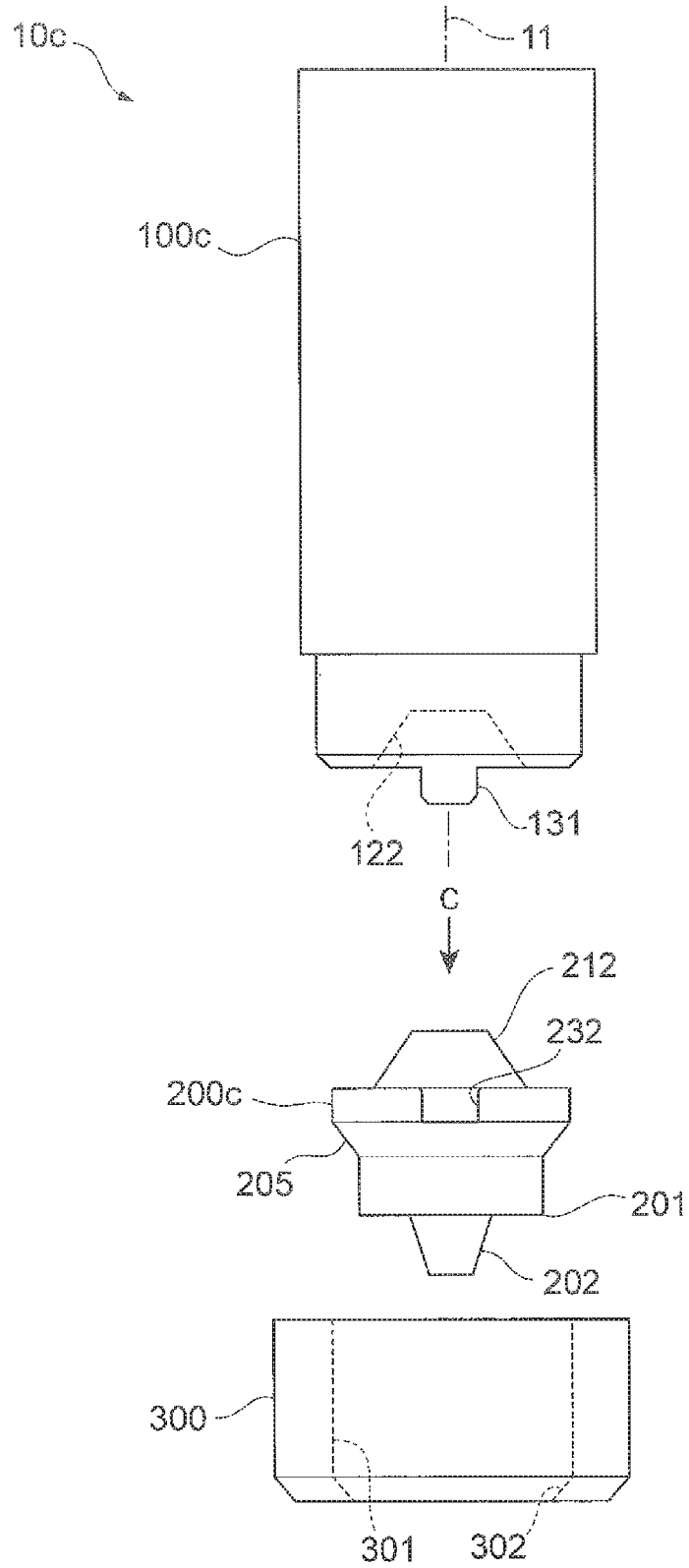
FIG. 5 is a side view showing a shank part, a tool part and a cap part according to a third embodiment.

Hereinafter, a third embodiment of the present invention will be described. As shown in FIG. 5, in a tool for friction stir welding 10c of the embodiment, a conical frustum concave section 122 recessed in a conical frustum shape is formed at a center of a front end of a shank part 100c. A side surface of the conical frustum concave section 122 is inclined toward the axis of rotation 11 of the shank part 100c while reaching the inside of the shank part 100c from the front end of the shank part 100c. In addition, keys 131 protruding in a direction parallel to the axis of rotation 11 at positions of 0° and 180° around the axis of rotation 11 are formed at a circumferential edge of the front end of the shank part 100c. These keys 131 may be disposed at positions of 0°, 90°, 180° and 270° around the axis of rotation 11 in a cross shape. In addition, an arbitrary number of keys 131 may be disposed.

Figure 6:
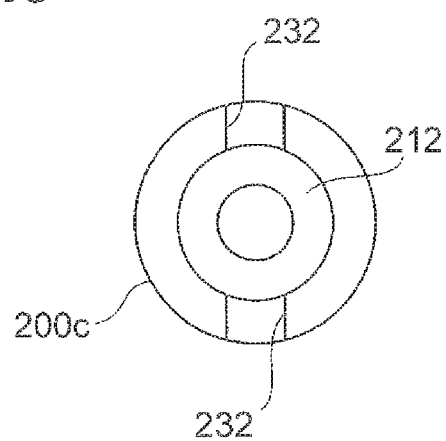
FIG. 6 is a plan view of the tool part of FIG. 5 when seen from a direction of an arrow C.

As shown in FIGS. 5 and 6, a conical frustum convex section 212 corresponding to a shape of the conical frustum concave section 122 of the shank part 100c is formed at a portion of a base section 205 of a tool part 200c that comes in contact with the shank part 100c. The side surface of the conical frustum convex section 212 is inclined toward the axis of rotation 11 of the shank part 100c serving as the axis of rotation of the tool part 200c while being separated from the base section 205 of the tool part 200c. Key grooves 232 recessed in a direction parallel to the axis of rotation 11 at positions of 0° and 180° around the axis of rotation 11 are formed in a circumferential edge of the base section 205 of the tool part 200c to correspond to shapes of the keys 131 of the shank part 100c. These key grooves 232 may be disposed at positions of 0°, 90°, 180° and 270° around the axis of rotation 11 in a cross shape. In addition, an arbitrary number of key grooves 232 may be disposed.

Hereinafter, an action of the tool for friction stir welding 10c of the embodiment will be described. When the friction stir welding is performed using the tool for friction stir welding 10c, the conical frustum concave section 122 of the shank part 100c and the conical frustum convex section 212 of the tool part 200c, and the key 131 of the shank part 100c and the key groove 232 of the tool part 200c are fitted to each other, respectively. Since both of the conical frustum concave section 122 and the conical frustum convex section 212 have a truncated cone shape, the tool part 200c can move with respect to the shank part 100c in the direction parallel to the axis of rotation 11 of the shank part 100c. Meanwhile, since the key 131 and the key groove 232 are fitted to each other, movement of the tool part 200c with respect to the shank part 100c in the direction around the axis of rotation 11 of the shank part 100c is restricted. Further, a release agent such as BN or the like is applied to the conical frustum concave section 122, the conical frustum convex section 212, the key 131 and the key groove 232 that come in contact with each other to effectively prevent burning.

In a state in which the conical frustum concave section 122 and the conical frustum convex section 212 are fitted to each other and the key 131 and the key groove 232 are fitted to each other, as the front end of the shank part 100c and the base section 205 of the tool part 200c are covered by the cap part 300, the tool part 200c is fixed to the front end of the shank part 100c. Here, the shoulder 201 and the probe 202 of the tool part 200c are exposed from the cap part 300. In this way, the friction stir welding can be performed in a state in which the tool part 200c is fixed to the front end of the shank part 100c. When the tool part 200c is detached from the shank part 100c, as the cap part 300 is detached from the shank part 100c and the tool part 200c, the tool part 200c can be easily detached from the shank part 100c.

According to the embodiment, since the protruding key 131 and the recessed key groove 232 are provided, the tool part 200c can move with respect to the shank part 100c in the direction parallel to the axis of rotation 11 of the shank part 100c while movement of the tool part 200c with respect to the shank part 100c in the direction around the axis of rotation 11 of the shank part 100c is reliably restricted due to the simple shape. In addition, in the embodiment, since the conical frustum convex section 212 protrudes from the tool part 200c abutting the workpiece and a length of the tool part 200c along the axis of rotation 11 is increased, strength of the tool part 200c can be improved.

Figure 7:
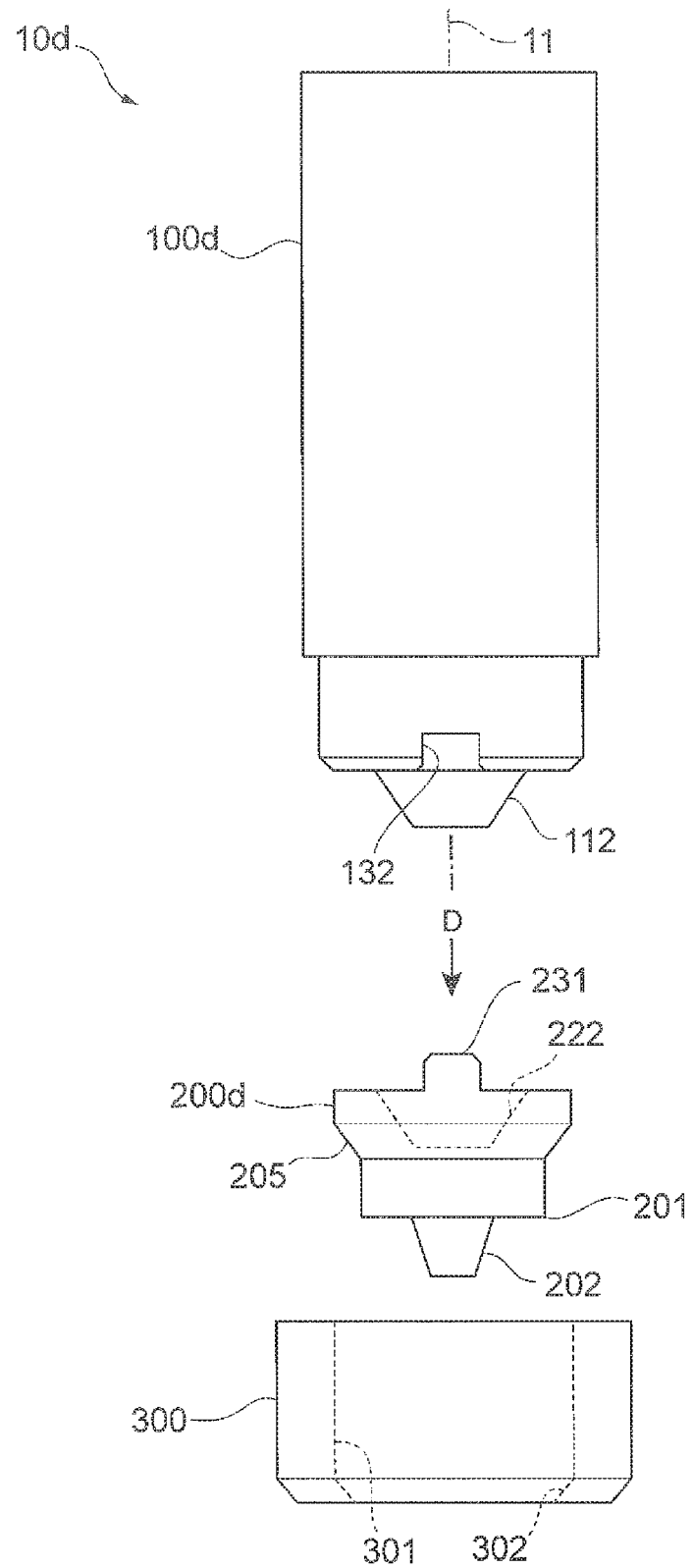
FIG. 7 is a side view showing a shank part, a tool part and a cap part according to a fourth embodiment.
Figure 8:
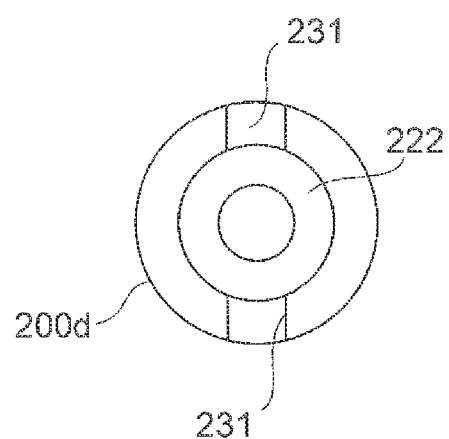
FIG. 8 is a plan view of the tool part of FIG. 7 when seen from a direction of an arrow D.

Hereinafter, a fourth embodiment of the present invention will be described. As shown in FIGS. 7 and 8, a tool for friction stir welding 10d of the embodiment is distinguished from the third embodiment in that the same conical frustum convex section 112 and the same key groove 132 as the conical frustum convex section 212 and the key groove 232 of the tool part 200c of the third embodiment are formed at a shank part 100d and the same conical frustum concave section 222 and the same key 231 as the conical frustum concave section 122 and the key 131 of the shank part 100c of the third embodiment are formed at a tool part 200d. The other configurations and actions of the tool for friction stir welding 10d are the same as the third embodiment.

In the embodiment, since the conical frustum concave section 222 is recessed in the tool part 200d abutting the workpiece, even when the tool part is manufactured using a relatively expensive material such as an Ir alloy or the like, manufacturing cost can be reduced by reducing an amount of the material used.

Figure 9:
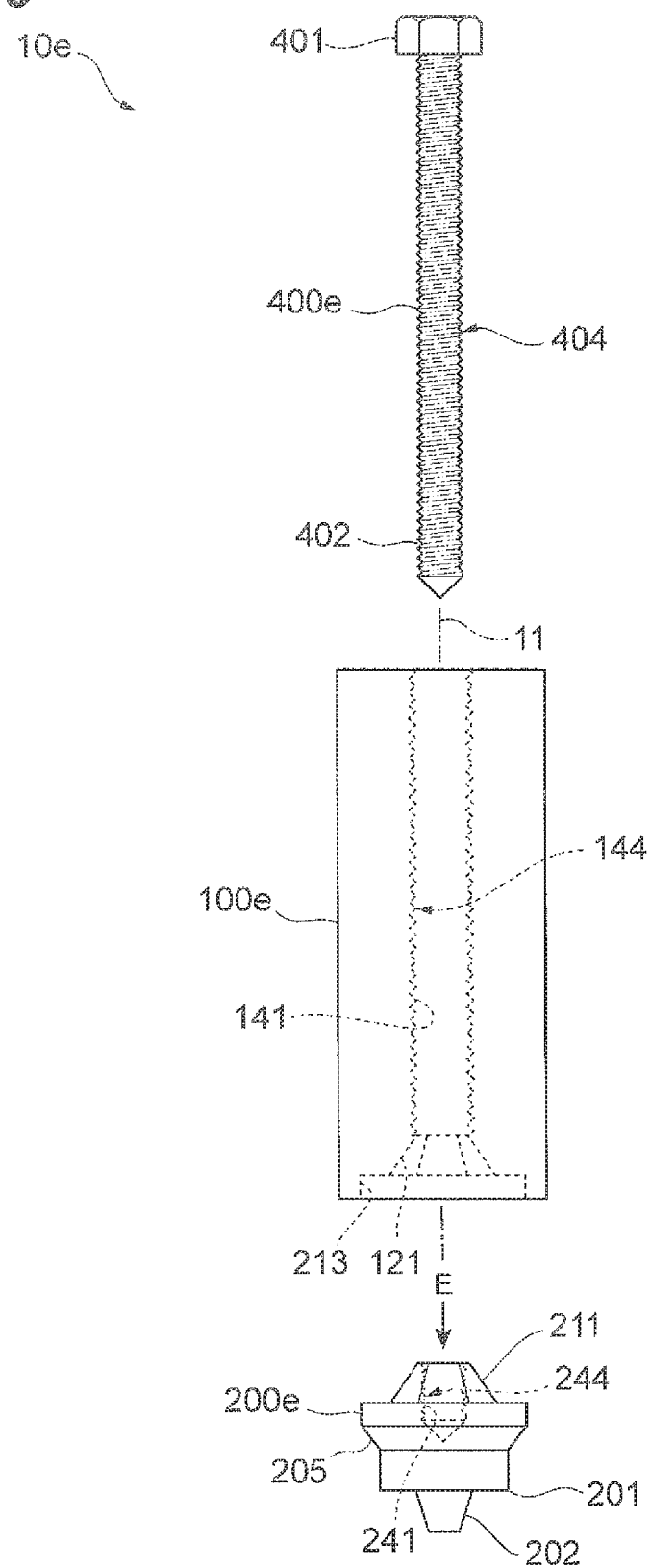
FIG. 9 is a side view showing a screw, a shank part and a tool part according to a fifth embodiment.

Hereinafter, a fifth embodiment of the present invention will be described. As shown in FIG. 9, a tool for friction stir welding 10e according to the fifth embodiment of the present invention includes a shank part 100e, a tool part 200e and a screw 400e.

As shown in FIG. 9, the shank part 100e of the embodiment is distinguished from the first embodiment in that a hole section 141 is provided such that a screw front end portion 402 of the screw 400e passes through the shank part 100e to reach the tool part 200e fixed to the front end of the shank part 100e. Further, while a groove is not necessary to be formed in the inner periphery of the hole section 141, a groove meshed with a groove 404 of the outer periphery of the screw 400e may be formed in the inner periphery of the hole section 141. Further, as shown in FIG. 9, a groove 144 having a larger inner diameter than a screw hole section 241 of the tool part 200e may be formed at the inner periphery of the hole section 141 such that a tool part detachment screw having an outer diameter set to be meshed with the groove 144 is screwed thereinto. In addition, a collar 213 having an inner diameter slightly larger than the outer diameter of the tool part 200e may be formed in the shank part 100e. A central axis of the tool part 200e is easily matched with the axis of rotation 11 of the shank part 100e by the collar 213. In addition, a load of the screw 400e configured to connect the shank part 100e and the tool part 200e is reduced by the collar 213, and movement of the tool part 200e from the shank part 100e upon the friction stir welding can be prevented.

Figure 10:
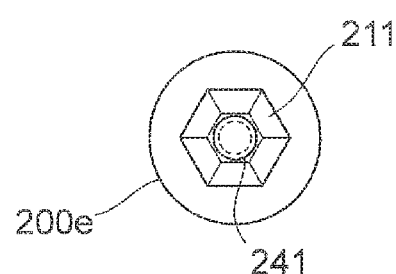
FIG. 10 is a plan view of the tool part of FIG. 9 when seen from a direction of an arrow E.

As shown in FIGS. 9 and 10, the tool part 200e of the embodiment is distinguished from the first embodiment in that the screw hole section 241 has a groove 244 formed in an inner periphery thereof and meshed with the groove 404 of the outer periphery of the screw front end portion 402 of the screw 400e that passes through the hole section 141.

As shown in FIG. 9, the screw 400e has the screw front end portion 402 having the groove 404 formed at the outer periphery and configured to fix the tool part 200e to the front end of the shank part 100e. A screw head section 401 having a larger diameter than the screw front end portion 402 and the hole section 141 is formed at an opposite side of the screw front end portion 402 of the screw 400e. A length of the screw 400e excluding the screw head section 401 corresponds to a length obtained by adding a length of the hole section 141 of the shank part 100e and a length of the screw hole section 241 of the tool part 200e. Further, while the groove 404 of the screw front end portion 402 may be formed within a range to be meshed with the groove 244 of the screw hole section 241 of the tool part 200e, as shown in FIG. 9, the groove 404 may be formed over the entire screw 400e except for the screw head section 401.

Further, the groove 404 of the outer periphery of the screw 400e and the groove 244 of the inner periphery of the screw hole section 241 of the tool part 200e are formed in a direction in which the screw 400e moves in an inward direction of the screw hole section 241 of the tool part 200e when the screw 400e is rotated in the same direction as the rotational direction of the shank part 100e. For example, when the screw grooves 404 and 244 formed in the screw 400e and the tool part 200e are formed in a conventional direction in which the screw 400e moves in the inward direction of the screw hole section 241 of the tool part 200e when the screw 400e is rotated clockwise when seen from the screw head section 401, the rotational direction of the shank part 100e upon the friction stir welding becomes clockwise when seen from the screw head section 401.

Hereinafter, an action of the tool for friction stir welding 10e of the embodiment will be described. When the friction stir welding is performed using the tool for friction stir welding 10e, like the first embodiment, the hexagonal frustum-shaped concave section 121 of the shank part 100e and the hexagonal frustum-shaped convex section 211 of the tool part 200e are fitted to each other. Since both of the hexagonal frustum-shaped concave section 121 and the hexagonal frustum-shaped convex section 211 have the hexagonal frustum shape, the tool part 200e can move with respect to the shank part 100e in the direction parallel to the axis of rotation 11 of the shank part 100e while movement of the tool part 200e with respect to the shank part 100e in the direction around the axis of rotation 11 of the shank part 100e is restricted.

Figure 11:
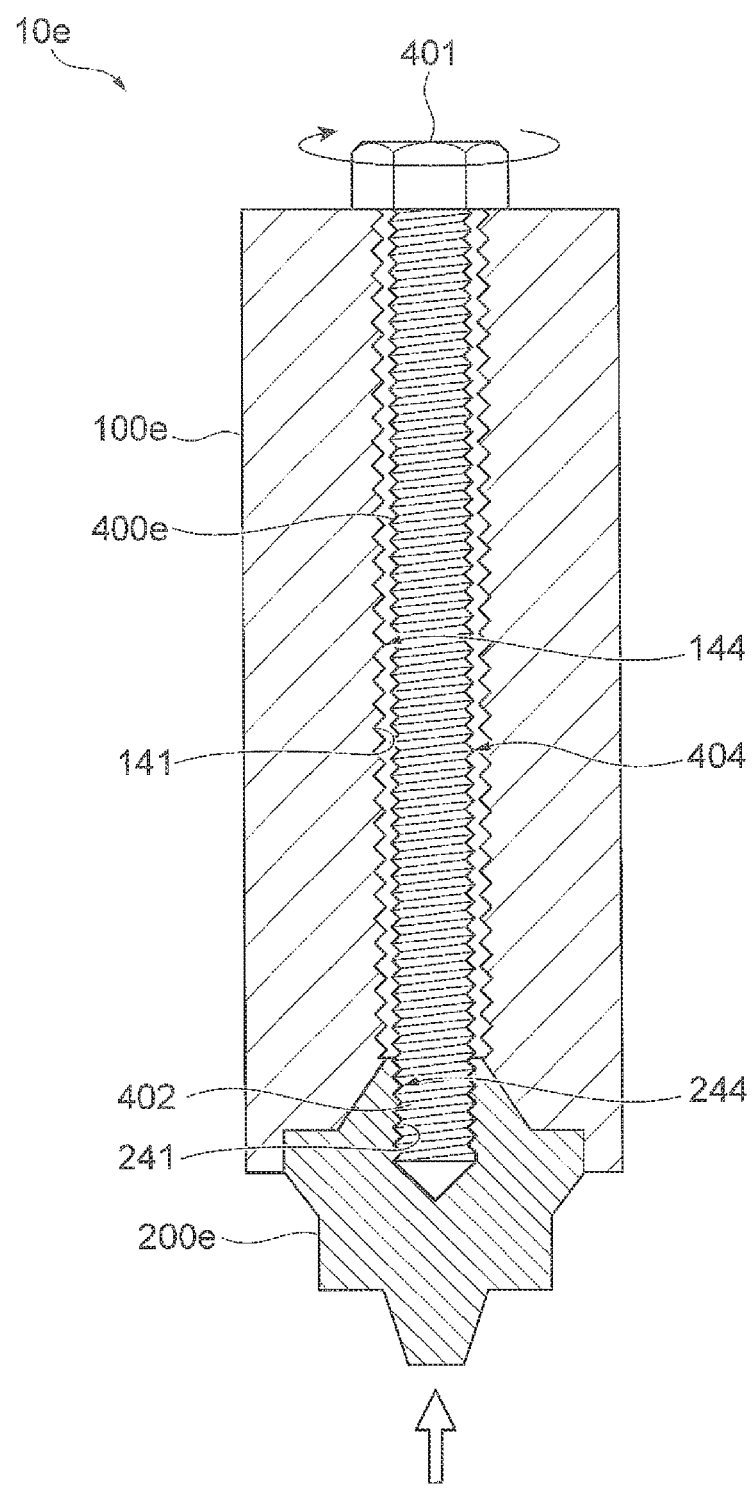
FIG. 11 is a longitudinal cross-sectional view showing a state in which the tool part is fixed to the shank part using the screw of FIG. 9.

In a state in which the hexagonal frustum-shaped concave section 121 and the hexagonal frustum-shaped convex section 211 are fitted to each other, as shown in FIG. 11, as the screw 400e is inserted into the hole section 141 of the shank part 100e while being rotated in a direction moving in the inward direction of the screw hole section 241 of the tool part 200e and the groove 404 of the outer periphery of the screw 400e that passes through the hole section 141 of the shank part 100e is meshed with the groove 244 of the inner periphery of the screw hole section 241 of the tool part 200e, the tool part 200e is fixed to the front end of the shank part 100e. In this way, the friction stir welding can be performed in a state in which the tool part 200e is fixed to the front end of the shank part 100e. Further, a release agent such as BN or the like is applied to the hexagonal frustum-shaped concave section 121 and the hexagonal frustum-shaped convex section 211 that come in contact with each other, the screw 400e and the hole section 141, and the screw hole section 241 to effectively prevent burning. When the tool part 200e is detached from the shank part 100e, in a state in which movement of the screw 400e in the direction parallel to the axis of rotation 11 of the shank part 100e is restricted, as the screw 400e is rotated away from the screw hole section 241 of the tool part 200e, the tool part 200e can be easily detached from the shank part 100e.

Figure 12:
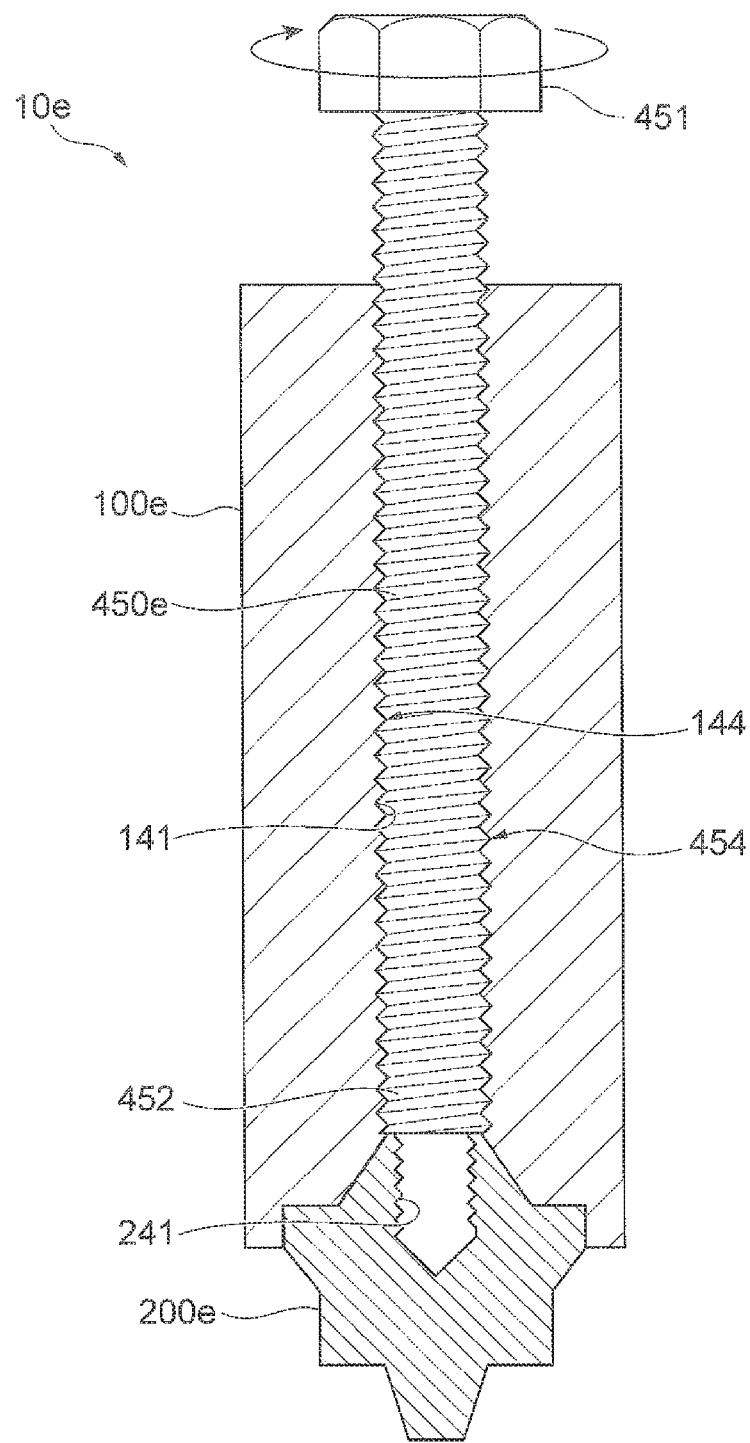
FIG. 12 is a longitudinal cross-sectional view showing a state in which the screw is detached from the state of FIG. 11 and a tool part detachment screw is screwed into the shank part.
Figure 13:
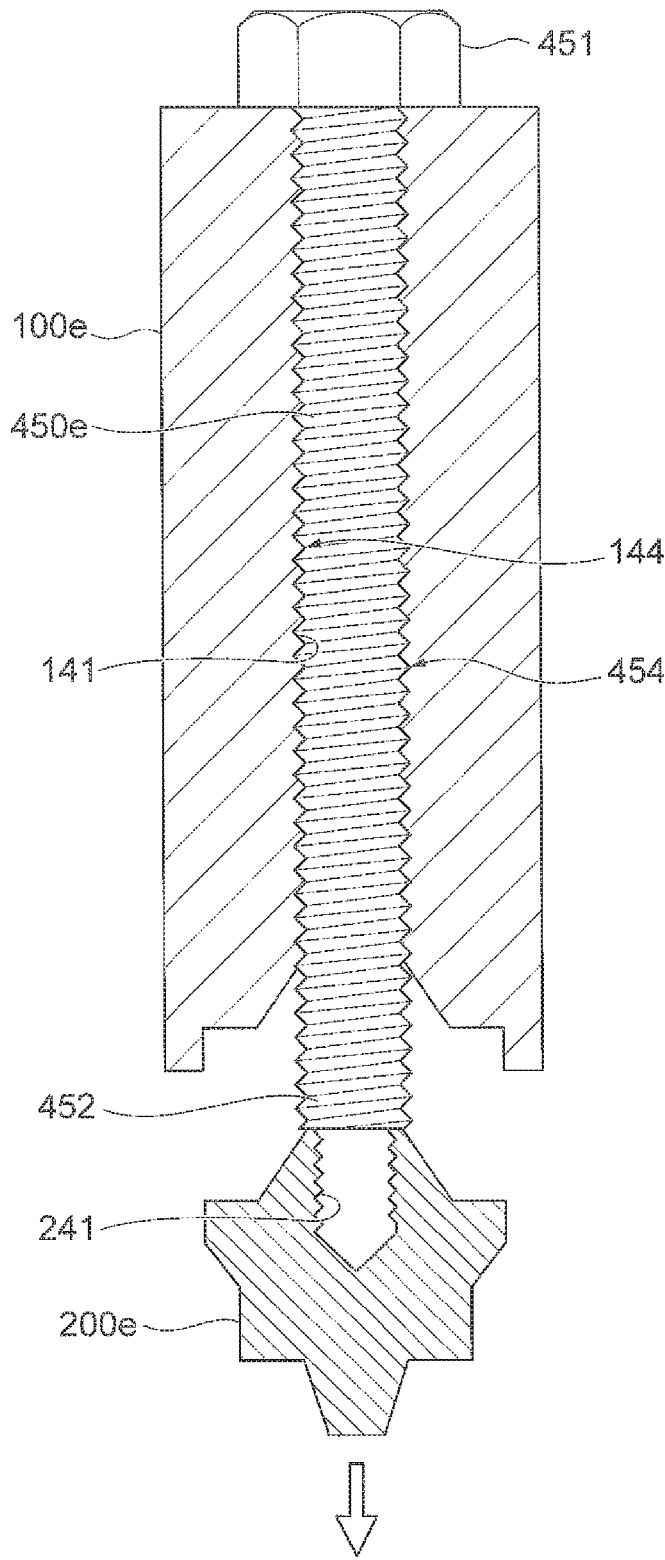
FIG. 13 is a longitudinal cross-sectional view showing a state in which the tool part is detached from the shank part as the tool part detachment screw is screwed further thereinto from the state of FIG. 12.

In addition, as shown in FIG. 9, when the groove 144 having a larger inner diameter than the screw hole section 241 of the tool part 200e is formed in the hole section 141 of the shank part 100e, first, the screw 400e is detached from the tool part 200e and the shank part 100e. Next, as shown in FIG. 12, a tool part detachment screw 450e having a groove 454 formed at an outer periphery thereof and meshed with the groove 144 formed in the inner periphery of the hole section 141 of the shank part 100e is screwed into the hole section 141. In an example of FIG. 12, when seen from a screw head section 451 of the tool part detachment screw 450e, as the tool part detachment screw 450e is rotated clockwise, a screw front end portion 452 of the tool part detachment screw 450e abuts the tool part 200e. As shown in FIG. 13, as the tool part detachment screw 450e is further rotated clockwise when seen from the screw head section 451, the tool part 200e is pushed out by the screw front end portion 452 of the tool part detachment screw 450e, and the tool part 200e is detached from the shank part 100e.

According to the embodiment, after the hexagonal frustum-shaped convex section 211 and the hexagonal frustum-shaped concave section 121 of the tool part 200e and the shank part 100e are fitted to each other, as the screw 400e passing through the hole section 141 of the shank part 100e is screwed into the screw hole section 241 of the tool part 200e, since movement of the tool part 200e with respect to the shank part 100e in the direction around the axis of rotation 11 of the shank part 100e is restricted by the hexagonal frustum-shaped convex section 211 and the hexagonal frustum-shaped concave section 121 that are fitted to each other, the groove 404 of the outer periphery of the screw 400e is meshed with the groove 244 of the inner periphery of the screw hole section 241 of the tool part 200e, and the tool part 200e is pulled and fixed to the shank part 100e.

Since movement of the tool part 200e with respect to the shank part 100e in the direction around the axis of rotation 11 of the shank part 100e is restricted by the hexagonal frustum-shaped convex section 211 and the hexagonal frustum-shaped concave section 121 that are fitted to each other and movement of the tool part 200e with respect to the shank part 100e in the direction parallel to the axis of rotation 11 of the shank part 100e is restricted by the screw 400e, it is possible to reliably prevent the tool part 200e from being deviated with respect to the shank part 100e in the direction around the axis of rotation 11 of the shank part 100e upon rotation the shank part 100e, fixation of the tool part 200e and the shank part 100e from being loosened, and the tool part 200e from falling out of the shank part 100e.

Meanwhile, in a state in which movement of the screw 400e in the direction parallel to the axis of rotation 11 of the shank part 100e is restricted by rotation of the screw 400e away from the screw hole section 241 of the tool part 200e, since the tool part 200e can move with respect to the shank part 100e in the direction parallel to the axis of rotation 11 of the shank part 100e, while movement of the tool part 200e with respect to the shank part 100e in the direction around the axis of rotation 11 of the shank part 100e is restricted by the hexagonal frustum-shaped convex section 211 and the hexagonal frustum-shaped concave section 121 that are fitted to each other, the groove 404 of the outer periphery of the screw 400e is meshed with the groove 244 of the inner periphery of the screw hole section 241 of the tool part 200e, and the tool part 200e is detached from the shank part 100e by applying a force in a direction away from the shank part 100e. Accordingly, the tool part 200e can be easily detached from the shank part 100e.

In addition, as the groove 144 having a larger diameter than the screw hole section 241 of the tool part 200e is formed in the hole section 141 of the shank part 100e and the tool part detachment screw 450e having a diameter set to be meshed with the groove 144 is screwed thereinto, the tool part 200e is detached from the shank part 100e by applying a force in a direction away from the shank part 100e. Accordingly, the tool part 200e can be easily detached from the shank part 100e.

In addition, in the embodiment, the groove 404 of the outer periphery of the screw 400e and the groove 244 of the inner periphery of the screw hole section 241 of the tool part 200e are configured such that the screw 400e is moved in the inward direction of the screw hole section 241 of the tool part 200e when the screw 400e is rotated in the same direction as the rotational direction of the shank part 100e. Accordingly, upon rotation of the shank part 100e, since a force is applied in the direction in which the screw 400e is moved in the inward direction of the screw hole section 241 of the tool part 200e, it is possible to effectively prevent fixation of the tool part 200e and the shank part 100e from loosening and the tool part 200e from falling out of the shank part 100e due to loosening of the screw 400e.

In addition, in the embodiment, the hexagonal frustum-shaped concave section 121 is recessed in a hexagonal frustum shape, and the hexagonal frustum-shaped convex section 211 protrudes in a hexagonal frustum shape. For this reason, the tool part 200e can be easily moved with respect to the shank part 100e in the direction parallel to the axis of rotation 11 of the shank part 100e while movement of the tool part 200e with respect to the shank part 100e in the direction around the axis of rotation 11 of the shank part 100e is restricted due to the simple shape.

In addition, in the embodiment, since the hexagonal frustum-shaped convex section 211 protrudes from the tool part 200e abutting the workpiece and a length of the tool part 200e along the axis of rotation 11 is increased, strength of the tool part 200e can be improved.

Figure 15:
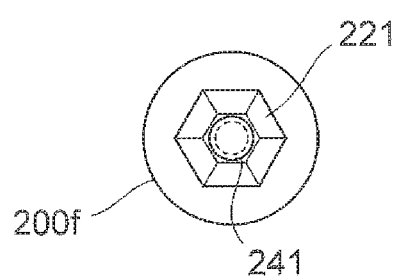
FIG. 15 is a plan view of a tool for friction stir welding of FIG. 14 when seen from a direction of an arrow F.

Hereinafter, a sixth embodiment of the present invention will be described. As shown in FIGS. 14 and 15, a tool for friction stir welding 10f of the embodiment is distinguished from the fifth embodiment in that the same hexagonal frustum-shaped convex section 111 as the hexagonal frustum-shaped convex section 211 of the tool part 200e of the fifth embodiment is provided at a shank part 100f and the same hexagonal frustum-shaped concave section 221 as the hexagonal frustum-shaped concave section 121 of the shank part 100e of the fifth embodiment is provided at a tool part 200f.

In addition, as shown in FIG. 14, the embodiment is distinguished from the fifth embodiment in that an increased hole diameter section 142 having a larger inner diameter than the hole section 141 is formed at the hole section 141 of the shank part 100f close to the screw head section 401. For this reason, a length of a screw 400f excluding the screw head section 401 corresponds to a length obtained by adding a length of the hole section 141 of the shank part 100f smaller than that of the fifth embodiment and a length of the screw hole section 241 of the tool part 200f, and is smaller than that of the screw 400e of the fifth embodiment. The other configurations and actions of the tool for friction stir welding 10f are the same as the fifth embodiment.

In the embodiment, since the hexagonal frustum-shaped concave section 221 is recessed in the tool part 200f abutting the workpiece, even when the tool part is manufactured using a relatively expensive material such as an Ir alloy or the like, manufacturing cost can be reduced by reducing a use amount of the material. In addition, since the screw head section 401 of the screw 400f is accommodated in the increased hole diameter section 142, when exposure of the screw head section 401 from the shank part 100f is not preferable due to a situation in a facility that performs the friction stir welding, it is possible to prevent exposure of the screw head section 401 from the shank part 100f.

Figure 16:
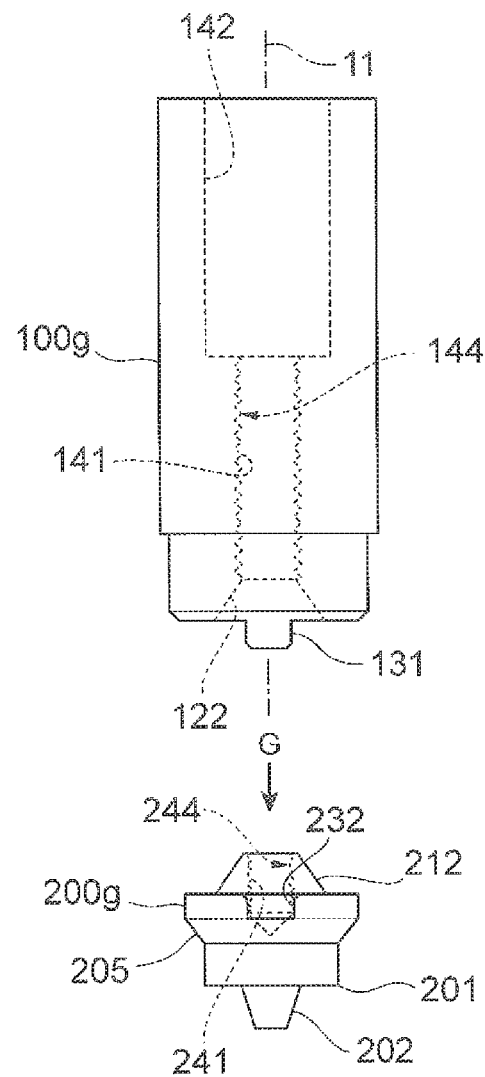
FIG. 16 is a side view showing a screw, a shank part and a tool part according to a seventh embodiment.
Figure 17:
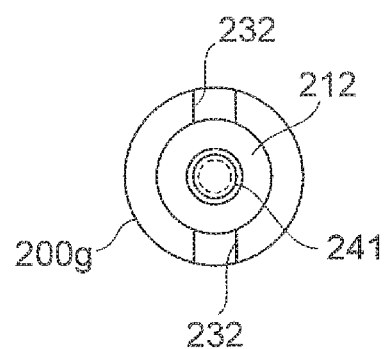
FIG. 17 is a plan view of a tool for friction stir welding of FIG. 16 when seen from a direction of an arrow G.

Hereinafter, a seventh embodiment of the present invention will be described. As shown in FIGS. 16 and 17, a tool for friction stir welding 10g of the embodiment is distinguished from the sixth embodiment in that, like the third embodiment, the conical frustum concave section 122 and the key 131 are provided at a shank part 100g and the conical frustum convex section 212 and the key groove 232 are provided at a tool part 200g. A length of a screw 400g excluding the screw head section 401 corresponds to a length obtained by adding a length of the hole section 141 of the shank part 100g smaller than that of the fifth embodiment and a length of the screw hole section 241 of the tool part 200g, and is smaller than that of the screw 400e of the fifth embodiment. The other configurations and actions of the tool for friction stir welding 10g are the same as the third embodiment and the sixth embodiment.

In the embodiment, since the protruding key 131 and the recessed key groove 232 are provided, the tool part 200g can move with respect to the shank part 100g in the direction parallel to the axis of rotation 11 of the shank part 100g while movement of the tool part 200g with respect to the shank part 100g in the direction around the axis of rotation 11 of the shank part 100g is reliably restricted due to the simple shape.

In addition, in the embodiment, since the conical frustum convex section 212 protrudes from the tool part 200g abutting the workpiece and the length of the tool part 200g along the axis of rotation 11 is increased, strength of the tool part 200g can be improved.

Figure 18:
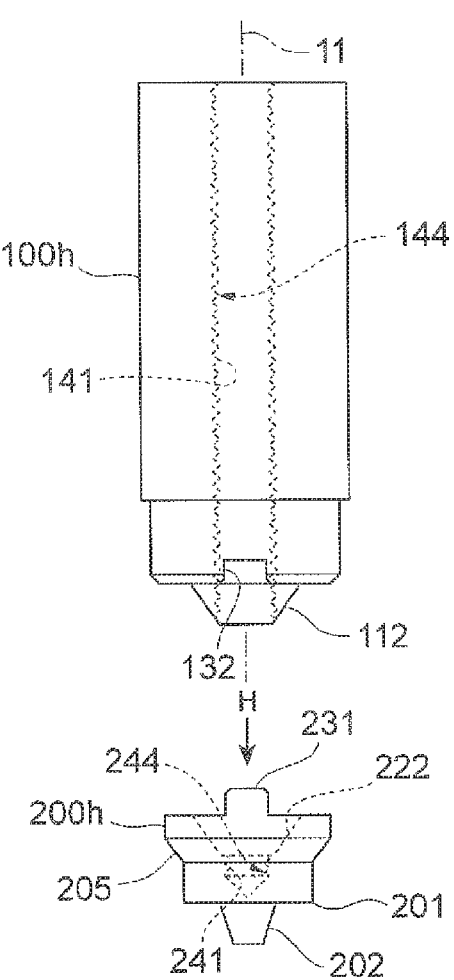
FIG. 18 is a side view showing a screw, a shank part and a tool part according to an eighth embodiment.
Figure 19:
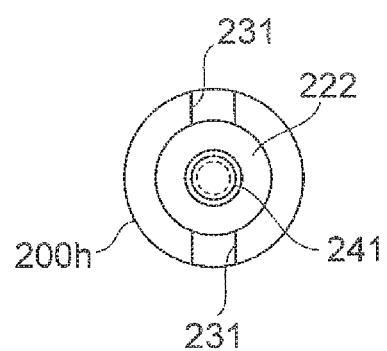
FIG. 19 is a plan view of a tool for friction stir welding of FIG. 18 when seen from a direction of an arrow H.

Hereinafter, an eighth embodiment of the present invention will be described. As shown in FIGS. 18 and 19, a tool for friction stir welding 10h of the embodiment is distinguished from the fifth embodiment in that, like the fourth embodiment, the conical frustum convex section 112 and the key groove 132 are provided at a shank part 100h and the conical frustum concave section 222 and the key 231 are provided at a tool part 200h. A length of a screw 400h excluding the screw head section 401 corresponds to a length obtained by adding a length of the hole section 141 of the shank part 100h and a length of the screw hole section 241 of the tool part 200h. The other configurations and actions of the tool for friction stir welding 10h are the same as the fourth embodiment and the fifth embodiment.

According to the embodiment, since the protruding key 231 and the recessed key groove 132 are provided, the tool part 200h can move with respect to the shank part 100h in the direction parallel to the axis of rotation 11 of the shank part 100h while movement of the tool part 200h with respect to the shank part 100h in the direction around the axis of rotation 11 of the shank part 100h is reliably restricted due to the simple shape.

In addition, in the embodiment, since the conical frustum concave section 222 is recessed in the tool part 200h abutting the workpiece, even when the tool part is manufactured using a relatively expensive material such as an Ir alloy or the like, manufacturing cost can be reduced by reducing an amount of the material used.

Figure 20:
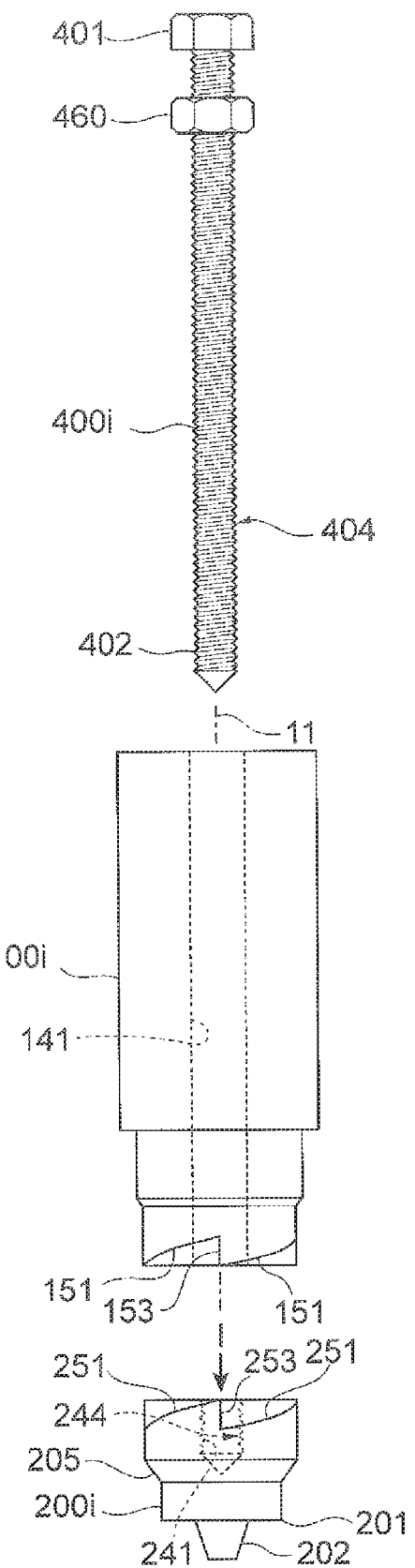
FIG. 20 is a side view showing a screw, a nut, a shank part and a tool part according to a ninth embodiment.

Hereinafter, a ninth embodiment of the present invention will be described. As shown in FIG. 20, a tool for friction stir welding 10i of the embodiment is distinguished from the fifth embodiment in that a serrated shape 151 protruding in a serrated shape and including a vertical surface 153 parallel to the axis of rotation 11 of the shank part 100i and perpendicular to the direction around the axis of rotation 11 is provided at a front end of a shank part 100i. In addition, the embodiment is distinguished from the fifth embodiment in that a length of a screw 400i excluding the screw head section 401 is sufficiently greater than a length obtained by adding a length of the hole section 141 of the shank part 100i and a length of the screw hole section 241 of a tool part 200i, and further, a nut 460 is provided at the screw head section 401 side of the screw 400i. The nut 460 has a groove formed in the inner periphery and meshed with the groove 404 of the outer periphery of the screw 400i, and has an outer diameter larger than the inner diameter of the hole section 141. Four serrated shapes 151 that include the common vertical surface 153 are disposed at the front end of the shank part 100i.

Figure 21:
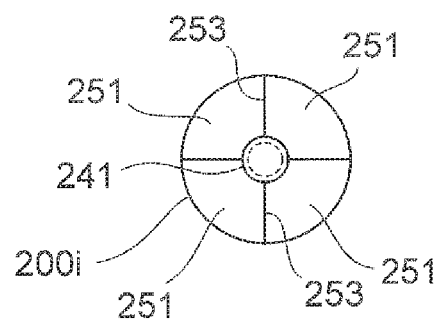
FIG. 21 is a plan view of a tool for friction stir welding of FIG. 20 when seen from a direction of an arrow I.

In addition, as shown in FIGS. 20 and 21, the tool for friction stir welding 10i of the embodiment is distinguished from the fifth embodiment in that a serrated shape 251 including the vertical surface 253 parallel to the axis of rotation 11 of the shank part 100i and perpendicular to the direction around the axis of rotation 11 is provided at a bottom section of the base section 205 of the tool part 200i. The serrated shape 251 of the tool part 200i has a shape corresponding to a shape of the serrated shape 151 of the shank part 100i, and is disposed to correspond to the disposition of the serrated shape 151 of the shank part 100i. The four serrated shapes 251 that include the common vertical surface 253 are disposed at the bottom section of the base section 205 of the tool part 200i. Further, the shapes and the numbers of the serrated shapes 151 and the serrated shapes 251 may be arbitrarily selected.

Hereinafter, an action of the tool for friction stir welding 10i of the embodiment will be described. When the friction stir welding is performed using the tool for friction stir welding 10i, like the fifth embodiment, the serrated shape 151 of the shank part 100i and the serrated shape 251 of the tool part 200i are fitted to each other.

The serrated shape 151 includes the vertical surface 153 parallel to the axis of rotation 11 of the shank part 100i and perpendicular to the direction around the axis of rotation 11, and the serrated shape 251 includes the vertical surface 253 parallel to the axis of rotation 11 of the shank part 100i and perpendicular to the direction around the axis of rotation 11. For this reason, the tool part 200i can move with respect to the shank part 100i in the direction parallel to the axis of rotation 11 of the shank part 100i while movement of the tool part 200i with respect to the shank part 100i in the direction around the axis of rotation 11 of the shank part 100i is reliably restricted.

In the embodiment, as the vertical surfaces 153 and 253 perpendicular to the direction around the axis of rotation 11 abut each other, when seen from the screw head section 401 inserted after that, movement of the tool part 200i with respect to the shank part 100i in a counterclockwise direction is reliably restricted. Accordingly, the rotational direction of the shank part 100i upon the friction stir welding becomes clockwise when seen from the screw head section 401.

Figure 22:
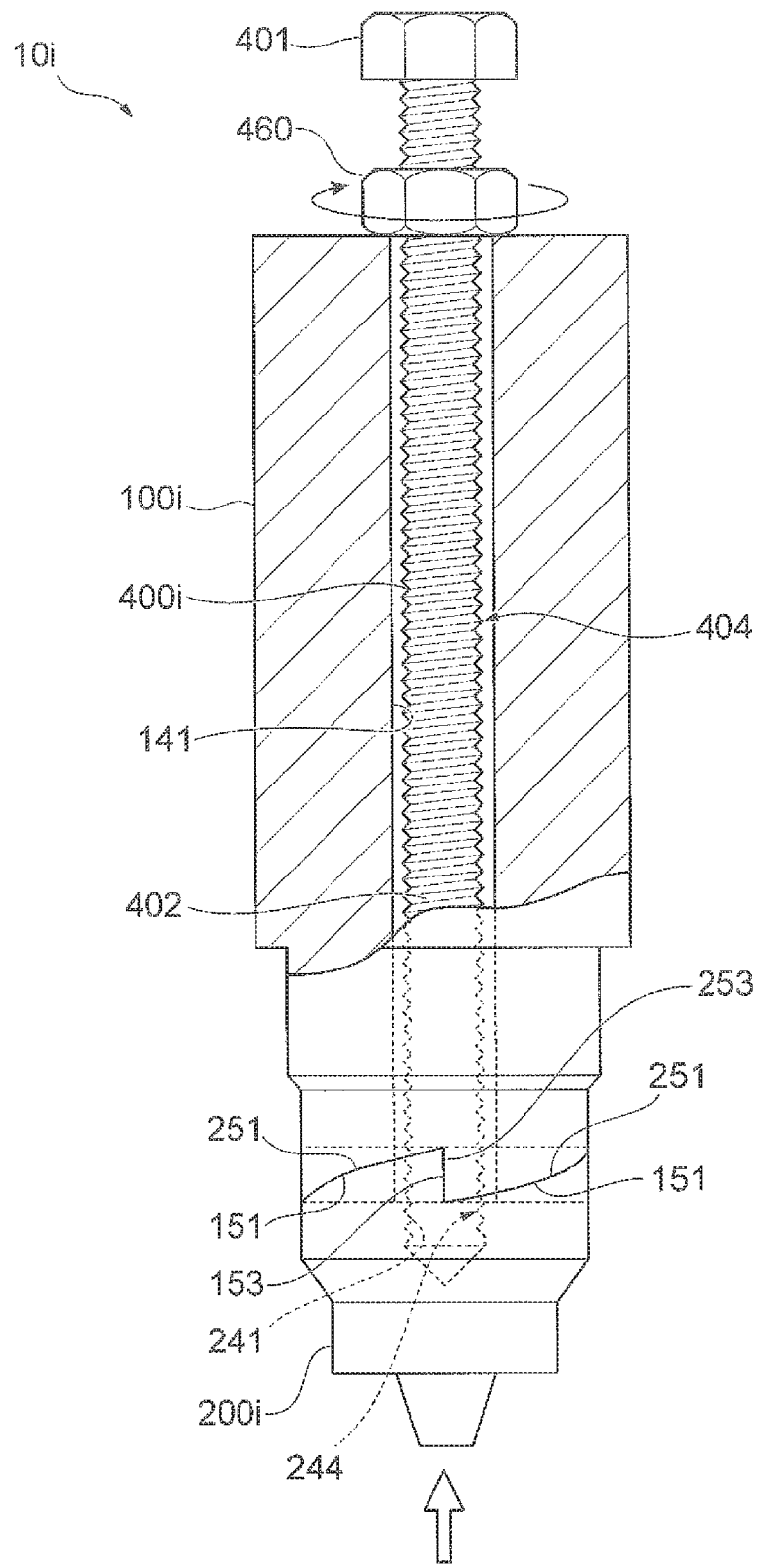
FIG. 22 is a partial cross-sectional view showing a state in which the tool part is fixed to the shank part using the screw and the nut of FIG. 20.

As shown in FIG. 20, the screw 400i passes through the nut 460 while the groove 404 of the outer periphery of the screw 400i and the groove of the inner periphery of the nut 460 are meshed with each other. In a state in which the shank part 100i is disposed between the tool part 200i and the nut 460, the groove 404 of the outer periphery of the screw 400i that passed through the hole section 141 is meshed with the groove 244 of the inner periphery of the screw hole section 241. As shown in FIG. 22, as the nut 460 is rotated in a direction in which the nut 460 and the tool part 200i approach each other, the tool part 200i is fixed to the front end of the shank part 100i.

Figure 23:
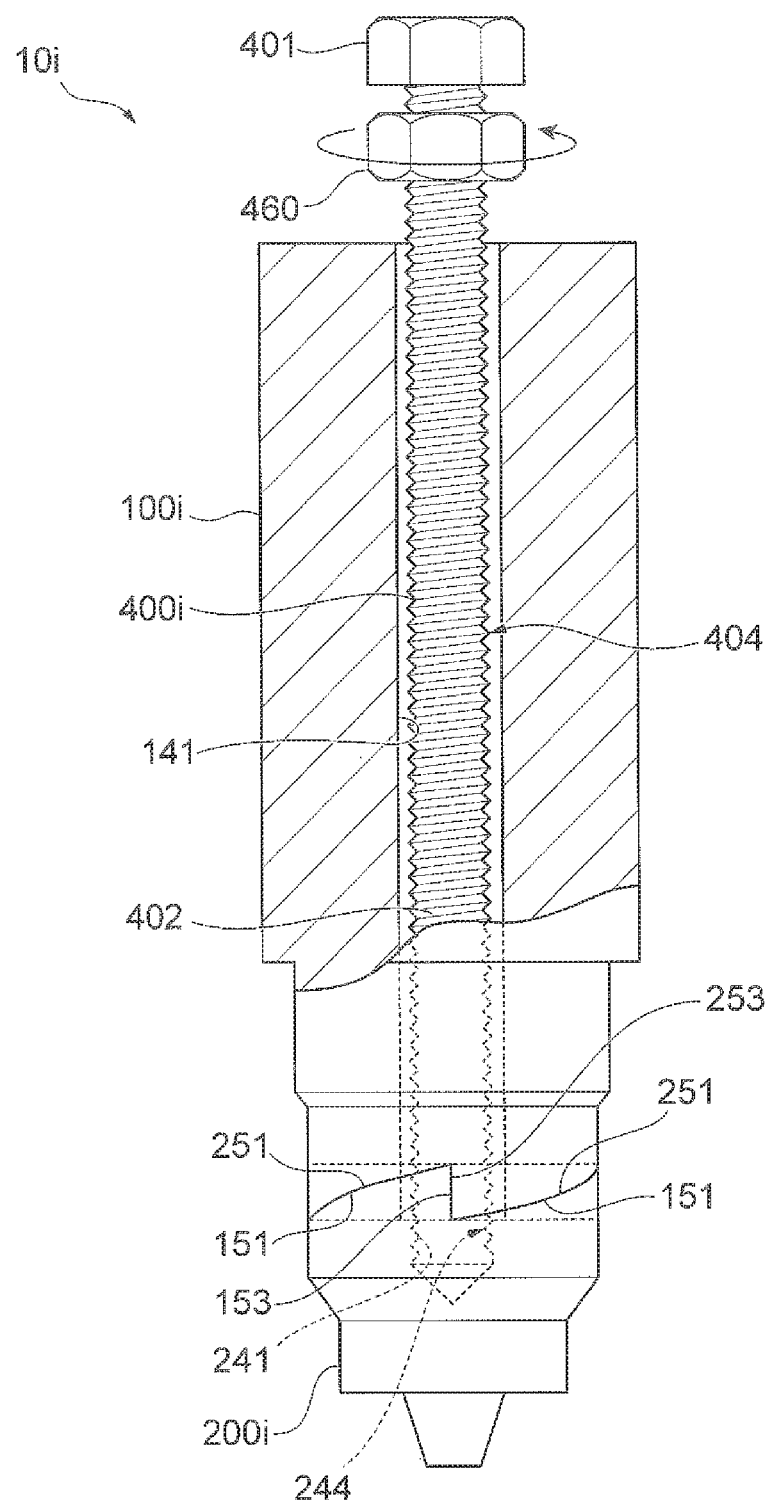
FIG. 23 is a partial cross-sectional view showing a state in which the nut is rotated away from the tool part from the state of FIG. 22.

When the tool part 200i is detached from the shank part 100i, first, as shown in FIG. 23, the nut 460 is rotated in the direction in which the nut 460 and the tool part 200i move away from each other. Accordingly, the tool part 200i and the screw 400i can move in the direction parallel to the axis of rotation 11 of the shank part 100i.

Figure 24:
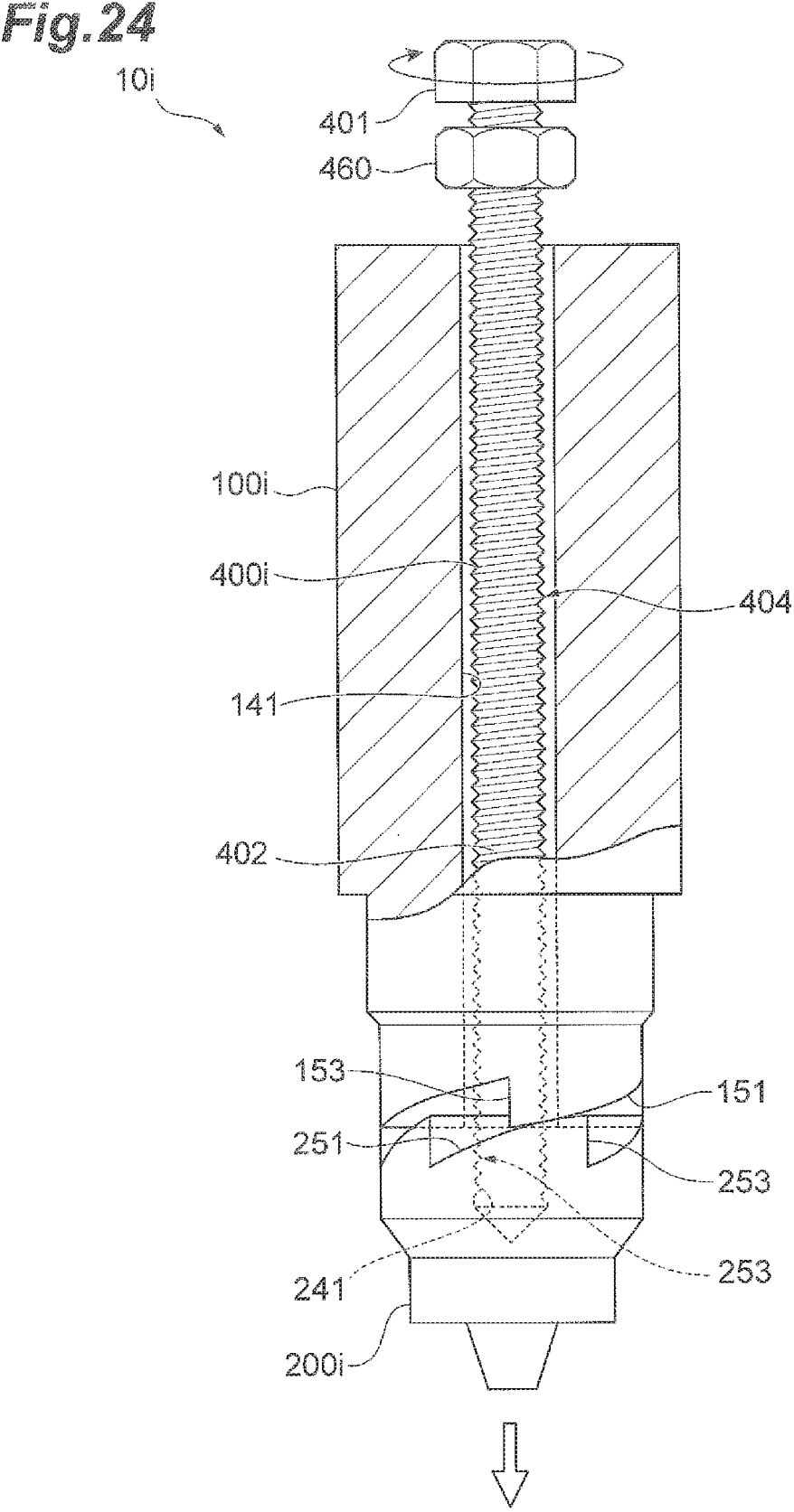
FIG. 24 is a partial cross-sectional view showing a state in which the screw is rotated from the state of FIG. 23 to detach the tool part from the shank part in a direction in which a serrated vertical surface of the tool part and a serrated vertical surface of the shank part are separated from each other.

Next, as shown in FIG. 24, the screw 400i is rotated in the direction in which the vertical surface 153 of the serrated shape 151 of the shank part 100i and the vertical surface 253 of the serrated shape 251 of the tool part 200i that are fitted to each other are separated from each other. The direction becomes clockwise when seen from the screw head section 401, and becomes a direction in which the screw 400i is screwed into the screw hole section 241. An inclined surface of the serrated shape 251 of the tool part 200i slides along an inclined surface of the serrated shape 151 of the shank part 100i, the tool part 200i is pushed out of the shank part 100i while rotating, and the tool part 200i is detached from the front end of the shank part 100i.

Accordingly, the tool part 200i is reliably fixed to the front end of the shank part 100i by screwing the screw 400i into the shank part 100i and the tool part 200i to fasten the nut 460, and then the nut 460 is loosened and the screw 400i is rotated clockwise when seen from the screw head section 401, the inclined surface of the serrated shape 251 of the tool part 200i and the inclined surface of the serrated shape 151 of the shank part 100i slide and the tool part 200i is detached from the shank part 100i by applying a force in a direction away from the shank part 100i. Accordingly, the tool part 200i can be easily detached from the shank part 100i. Further, a release agent such as BN or the like is applied to the serrated shape 151, the serrated shape 251, the screw 400i, the hole section 141 and the screw hole section 241 that come in contact with each other to effectively prevent burning.

Figure 25:
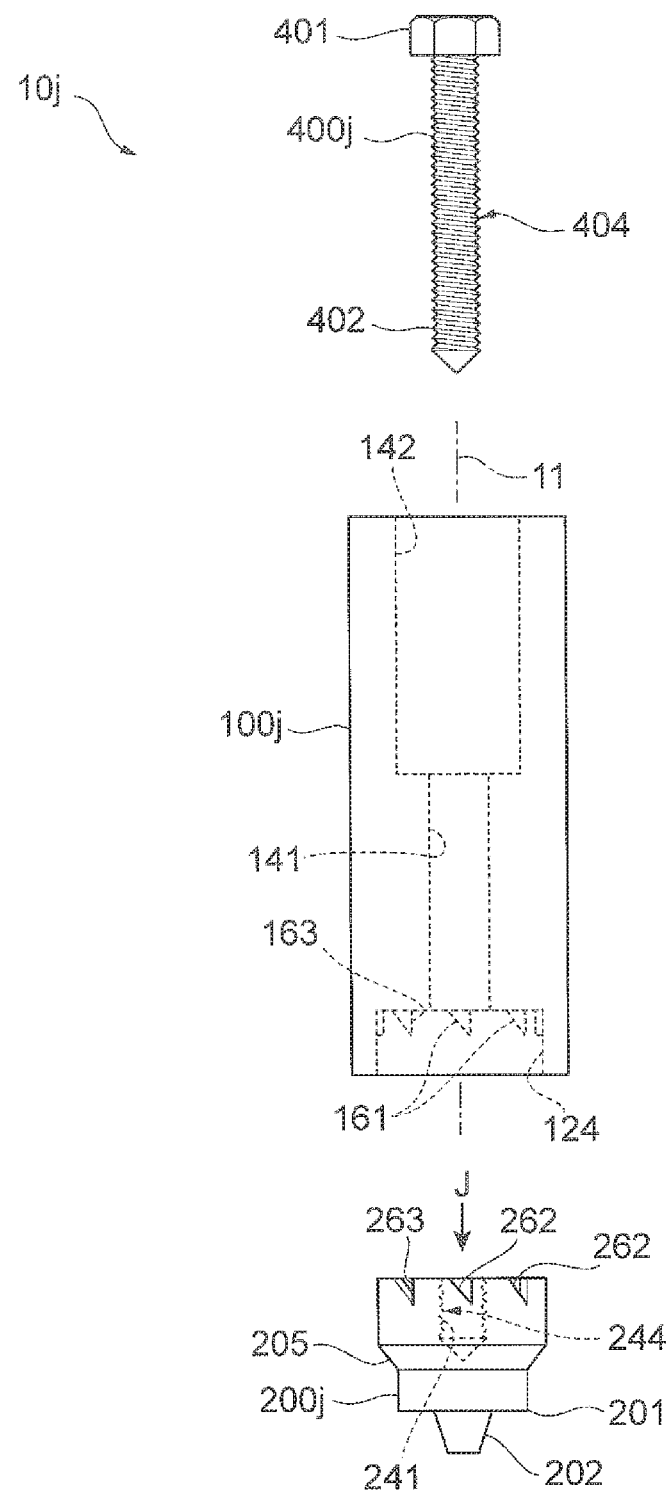
FIG. 25 is a side view showing a screw, a shank part and a tool part according to a tenth embodiment.

Hereinafter, a tenth embodiment of the present invention will be described. As shown in FIG. 25, a tool for friction stir welding 10j of the embodiment is distinguished from the ninth embodiment in that a serrated convex section 161 protruding in a serrated shape and including a vertical surface 163 parallel to the axis of rotation 11 of the shank part 100j and perpendicular to the direction around the axis of rotation 11 is provided at a columnar concave section 124 recessed in a columnar shape of a front end of a shank part 100j. In addition, the embodiment is distinguished from the ninth embodiment in that the increased hole diameter section 142 having a larger inner diameter than the hole section 141 is formed in the hole section 141 of the shank part 100j close to the screw head section 401. For this reason, a length of a screw 400j excluding the screw head section 401 corresponds to a length obtained by adding a length of the hole section 141 of the shank part 100j smaller than that of the ninth embodiment and a length of the screw hole section 241 of a tool part 200j and is smaller than that of the screw 400i of the ninth embodiment, and further, the nut 460 is not provided. In addition, the groove 404 of the screw 400j and the groove 244 of the screw hole section 241 are formed in a direction in which the screw 400j is screwed into the screw hole section 241 when the screw 400j is rotated counterclockwise when seen from the screw head section 401.

Figure 26:
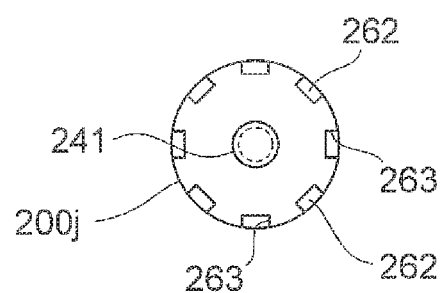
FIG. 26 is a plan view of a tool for friction stir welding of FIG. 25 when seen from a direction of an arrow J.

In addition, as shown in FIGS. 25 and 26, the tool for friction stir welding 10j of the embodiment is distinguished from the ninth embodiment in that a serrated concave section 262 recessed in a serrated shape and including a vertical surface 263 parallel to the axis of rotation 11 of the shank part 100j and perpendicular to the direction around the axis of rotation 11 is provided at the bottom section of the base section 205 of the tool part 200j. Further, the shapes and the numbers of the serrated convex section 161 and the serrated concave section 262 may be arbitrarily selected.

Figure 27:
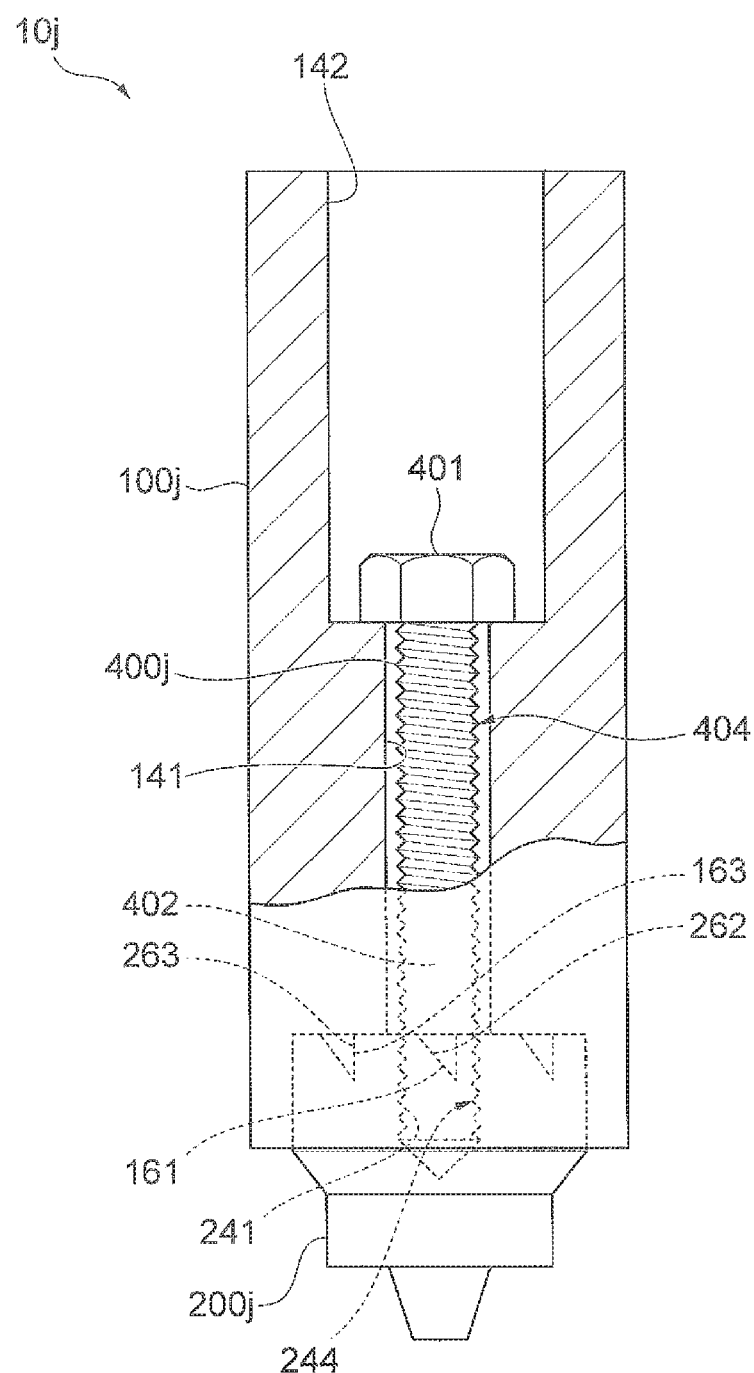
FIG. 27 is a partial cross-sectional view showing a state in which the tool part is fixed to the shank part using the screw of FIG. 25.

A configuration and an action of the tool for friction stir welding 10j will be described. As shown in FIG. 27, as the screw 400j is screwed into the shank part 100j and the tool part 200j, the tool part 200j is pulled to the shank part 100j, and the tool part 200j can be reliably fixed to the front end of the shank part 100j.

Figure 28:
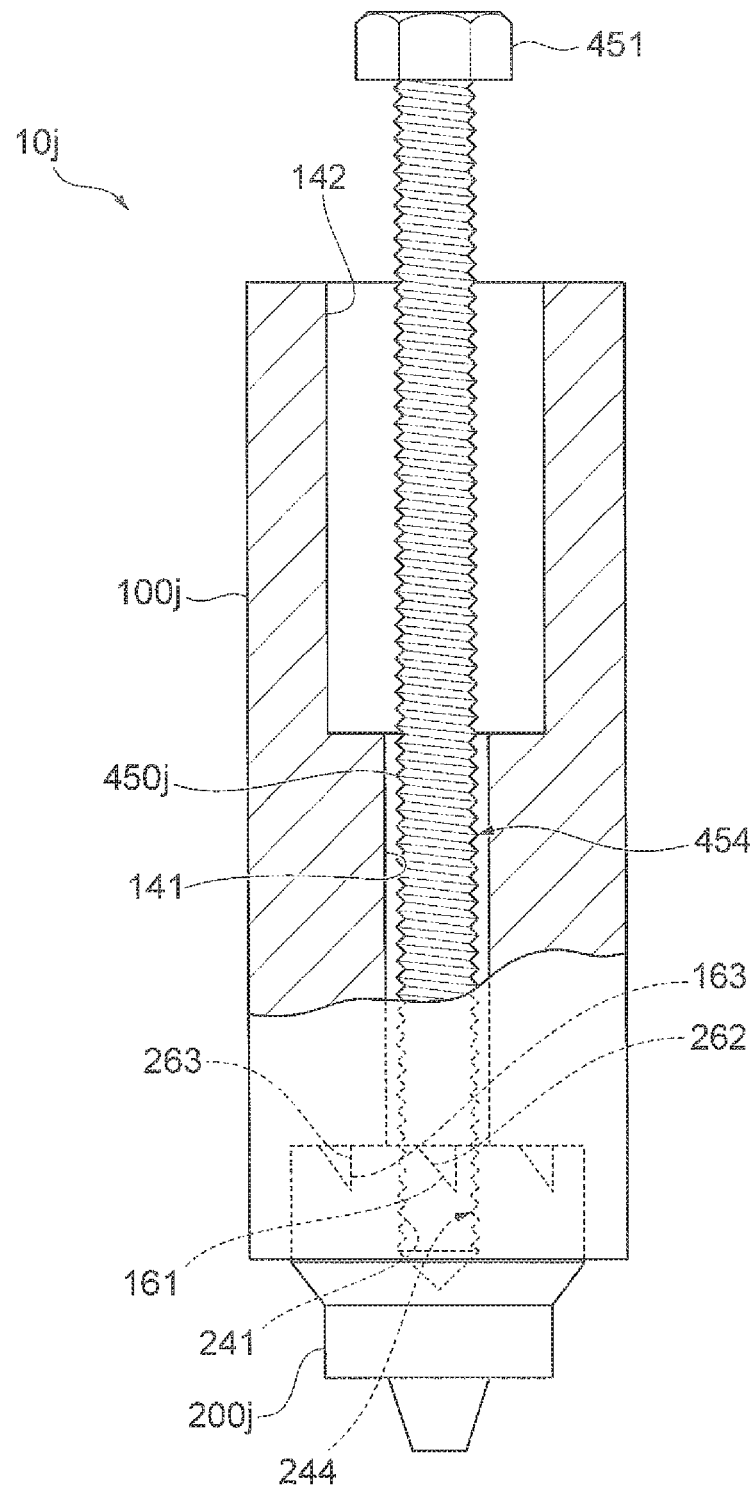
FIG. 28 is a partial cross-sectional view showing a state in which the screw is removed from the state of FIG. 27 and a tool part detachment screw is screwed into the tool part through the shank part.

When the tool part 200j is detached from the shank part 100j, first, the screw 400j is detached from the shank part 100j. Next, as shown in FIG. 28, a tool part detachment screw 450j having a sufficiently greater length than the screw 400j and the same groove 454 as the screw 400j formed in the outer periphery is screwed into the hole section 141 of the shank part 100j and the screw hole section 241 of the tool part 200j counterclockwise when seen from the screw head section 451. Accordingly, the tool part 200j and the tool part detachment screw 450j can move in the direction parallel to the axis of rotation 11 of the shank part 100j.

Figure 29:
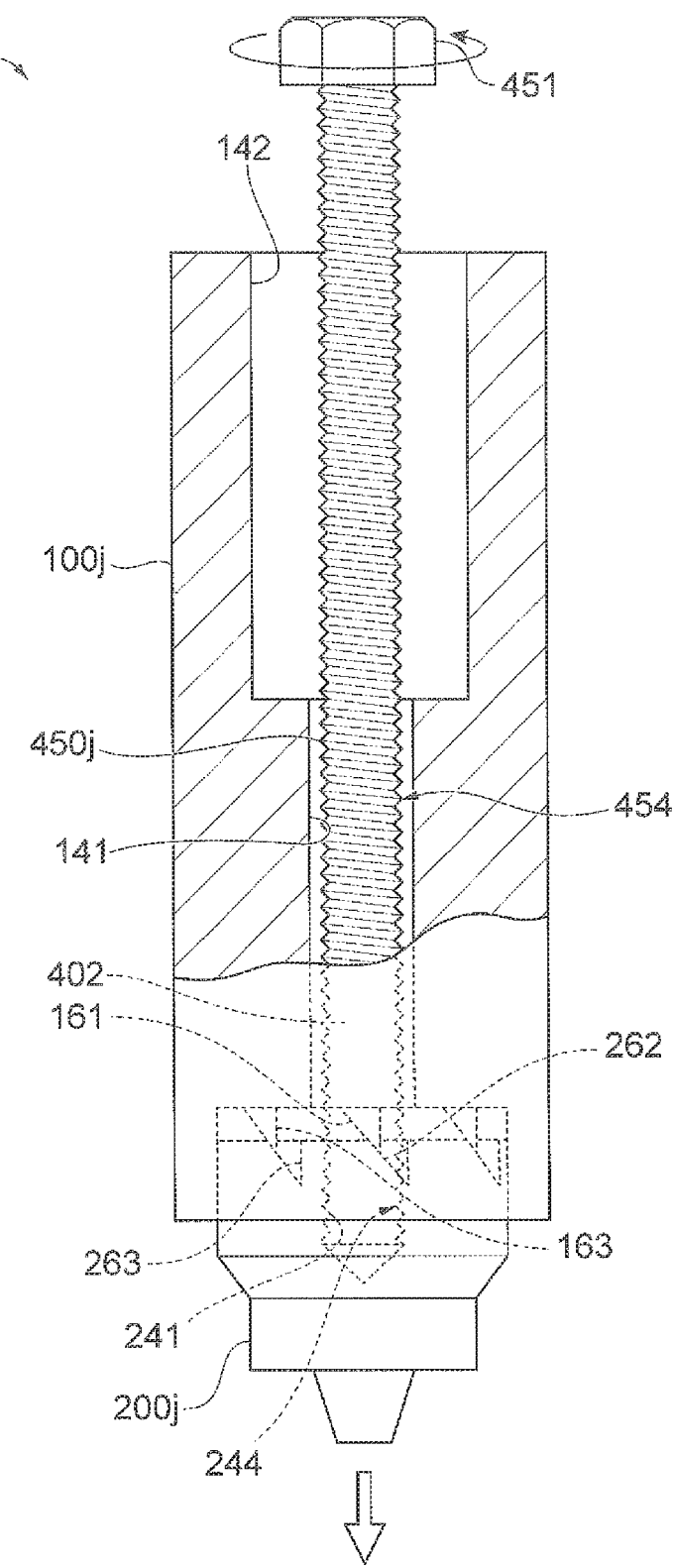
FIG. 29 is a partial cross-sectional view showing a state in which the tool part detachment screw is rotated from the state of FIG. 28 to detach the tool part from the shank part in a direction in which a serrated vertical surface of the tool part and a serrated vertical surface of the shank part are separated from each other.

Further, as shown in FIG. 29, as the tool part detachment screw 450j is rotated counterclockwise when seen from the screw head section 451, the tool part 200j is rotated in a direction in which the vertical surfaces 163 and 263 that are fitted to each other are separated from each other. The inclined surface of the serrated concave section 262 of the tool part 200j and the inclined surface of the serrated convex section 161 of the shank part 100j slide and the tool part 200j is detached from the shank part 100j by applying a force in a direction away from the shank part 100j. Accordingly, the tool part 200j can be easily detached from the shank part 100j.

Further, in the ninth embodiment, while the shank part 100i is configured to be rotated clockwise when seen from the screw head section 401, in the embodiment, the shank part 100j is configured to be rotated counterclockwise when seen from the screw head section 401. Directions in which the shank parts 100i and 100j are rotated differ according to the friction stir welding apparatus. However, as described in the ninth embodiment and this embodiment, design changes of the shank parts 100i and 100j and the tool parts 200i and 200j may be performed according to the rotational direction of the friction stir welding apparatus.

Further, a plurality of configurations of the increased hole diameter section 142, the hexagonal frustum-shaped concave section 121 and the hexagonal frustum-shaped convex section 211, the hexagonal frustum-shaped convex section 111 and the hexagonal frustum-shaped concave section 221, the conical frustum concave section 122 and the conical frustum convex section 212, the key 131 and the key groove 232, the conical frustum convex section 112 and the conical frustum concave section 222, the key groove 132 and the key 231, the serrated shape 151 and the serrated shape 251, and the serrated convex section 161 and the serrated concave section 262 of the fifth to tenth embodiments may be appropriately selected and combined with each other. In addition, even in the ninth and tenth embodiment, like the fifth embodiment, the tool parts 200i and 200j can be attached to the shank parts 100i and 100j using the screw 400e, and further, the tool parts 200i and 200j can be detached from the shank parts 100i and 100j using the tool part detachment screw 450e.

Figure 30:
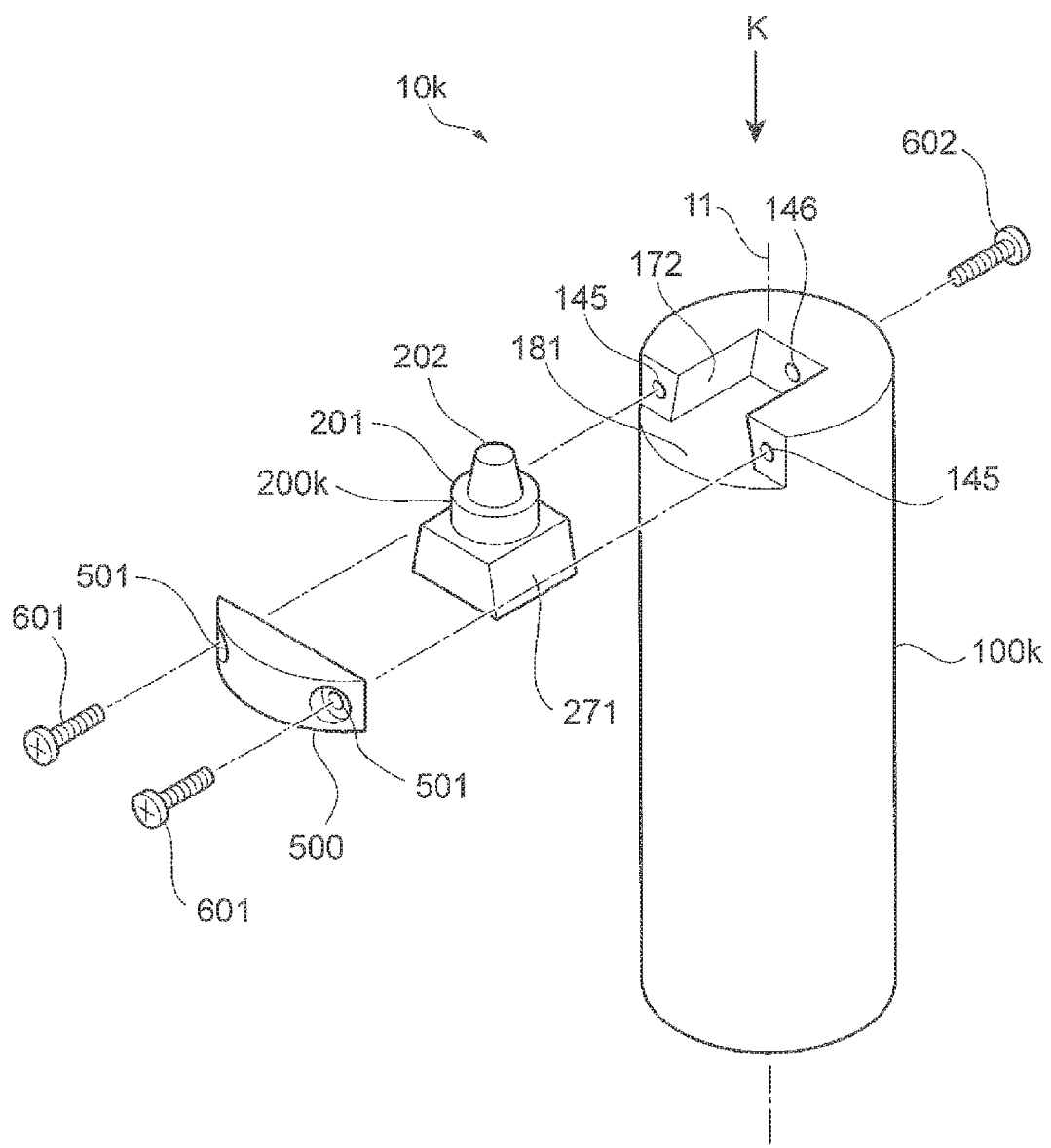
FIG. 30 is a perspective view showing a shank part, a tool part and a lid according to an eleventh embodiment.

Hereinafter, an eleventh embodiment of the present invention will be described. As shown in FIG. 30, the tool for friction stir welding 10k according to the eleventh embodiment of the present invention includes a shank part 100k, a tool part 200k and a lid section 500.

Figure 31:
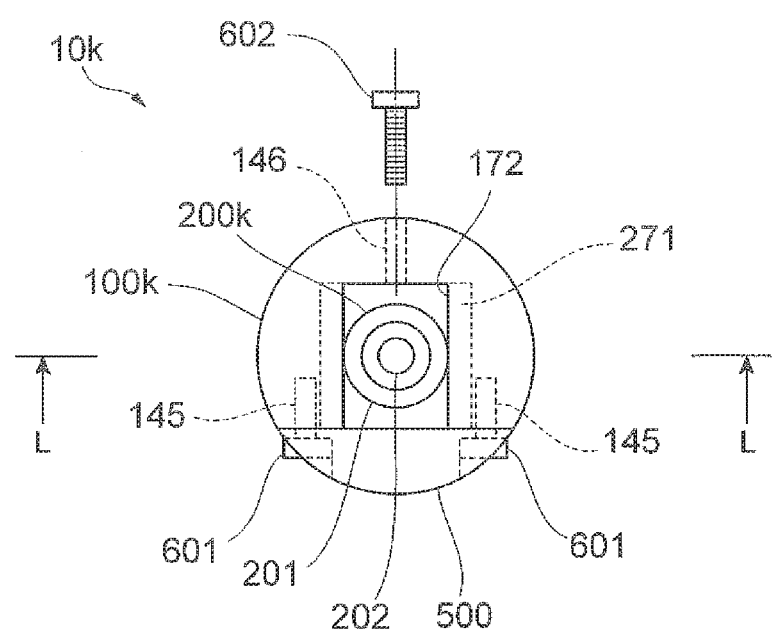
FIG. 31 is a plan view of the assembled shank part, tool part and lid of FIG. 30 when seen from a direction of an arrow K.

As shown in FIGS. 30 to 32, a dovetail groove section 172 recessed in a trapezoidal shape and extending in the direction perpendicular to the axis of rotation 11 is formed at a front end that is an upper end of a shank part 100k of FIG. 30. One end of the direction perpendicular to the axis of rotation 11 of the dovetail groove section 172 is opened in an outer periphery direction of the shank part 100k by a lid-attaching cutout 181 having a shape corresponding to a shape of a lid section 500. The other end in the direction perpendicular to the axis of rotation 11 of the dovetail groove section 172 terminates at the inside of the shank part 100k without reaching the outer periphery of the shank part 100k. The lid-attaching cutout 181 has a pair of lid-attaching screw hole sections 145. The shank part 100k has a tool part detachment screw hole section 146 formed from an end portion of the dovetail groove section 172 that terminates at the inside of the shank part 100k to the outer periphery of the shank part 100k. Both of the lid-attaching screw hole section 145 and the tool part detachment screw hole section 146 have grooves formed at inner periphery thereof.

As shown in FIGS. 30 to 32, a dovetail-shaped section 271 having a shape corresponding to a shape of the dovetail groove section 172 of the shank part 100k and protruding in a trapezoidal shape is formed at the bottom section of the tool part 200k. Further, in the embodiment, a dovetail-shaped section may be formed at the shank part 100k, and a dovetail groove section may be formed in the tool part 200k.

As shown in FIGS. 30 and 31, the lid section 500 has a shape corresponding to a shape of the lid-attaching cutout 181 of the shank part 100k. The lid section 500 has a screw hole section 501 formed at a position corresponding to the lid-attaching screw hole section 145 of the shank part 100k.

Hereinafter, an action of a tool for friction stir welding 10k of the embodiment will be described. When the friction stir welding is performed using the tool for friction stir welding 10k, as shown in FIGS. 31 and 32, the dovetail groove section 172 of the shank part 100k and the dovetail-shaped section 271 of the tool part 200k are fitted to each other. The dovetail groove section 172 extends in the direction perpendicular to the axis of rotation 11. For this reason, the tool part 200k can slide with respect to the shank part 100k in the direction perpendicular to the axis of rotation 11 of the shank part 100k while movement of the tool part 200k with respect to the shank part 100k in the direction parallel to the axis of rotation 11 of the shank part 100k is restricted. The dovetail-shaped section 271 is inserted into the dovetail groove section 172 until the dovetail-shaped section 271 abuts the end portion of the dovetail groove section 172 that terminates at the inside of the shank part 100k.

In a state in which the dovetail groove section 172 and the dovetail-shaped section 271 are fitted to each other, the lid section 500 is attached to the lid-attaching cutout 181 by a lid section attachment screw 601. As the lid section attachment screw 601 is attached, the tool part 200k cannot slide with respect to the shank part 100k in the direction perpendicular to the axis of rotation 11 of the shank part 100k, and the tool part 200k is fixed to the front end of the shank part 100k. Further, a release agent such as BN or the like is applied to the dovetail groove section 172, the dovetail-shaped section 271 and the lid section 500 that come in contact with each other to effectively prevent burning.

When the tool part 200k is detached from the shank part 100k, since the lid section 500 is detached from the shank part 100k, a tool part detachment screw 602 is screwed into the tool part detachment screw hole section 146, and a force is applied to the dovetail-shaped section 271 of the tool part 200k at the front end of the tool part detachment screw 602, even when the tool part 200k is hard to remove, the tool part 200k can be easily detached from the shank part 100k.

In the embodiment, the tool for friction stir welding includes the tool part 200k abutting the workpiece while rotating, the shank part 100k configured to fix the tool part 200k to the front end and rotated together with the tool part 200k, and the lid section 500 fixed to the lid-attaching cutout 181 in which the tool part 200k and the shank part 100k come in contact with each other. The dovetail-shaped section 271 protruding in the trapezoidal shape and the dovetail groove section 172 recessed in the trapezoidal shape are formed at portions of the tool part 200k and the shank part 100k in which the tool part 200k and the shank part 100k come in contact with each other such that the tool part 200k can slide with respect to the shank part 100k in the direction perpendicular to the axis of rotation 11 of the shank part 100k while movement of the tool part 200k with respect to the shank part 100k in the direction parallel to the axis of rotation 11 of the shank part 100k is restricted because the tool part and the shank part are fitted to each other. After the dovetail-shaped section 271 and the dovetail groove section 172 of the tool part 200k and the shank part 100k are fitted to each other, as the lid section 500 is fixed to the lid-attaching cutout 181 in which the tool part 200k and the shank part 100k come in contact with each other to restrict slide movement of the tool part 200k with respect to the shank part 100k in the direction perpendicular to the axis of rotation 11 of the shank part 100k, the tool part 200k is fixed to the front end of the shank part 100k.

For this reason, when the lid section 500 is fixed to the lid-attaching cutout 181, since movement of the tool part 200k with respect to the shank part 100k in the direction parallel to the axis of rotation 11 of the shank part 100k is restricted by the dovetail-shaped section 271 and the dovetail groove section 172 that are fitted to each other and slide movement of the tool part 200k with respect to the shank part 100k in the direction perpendicular to the axis of rotation 11 of the shank part 100k is restricted by the lid section 500, upon rotation of the shank part 100k, fixation of the tool part 200k and the shank part 100k can be reliably prevented from being loosened, and the tool part 200k can be reliably prevented from falling out of the shank part 100k. Meanwhile, when the lid section 500 is detached, even though the dovetail-shaped section 271 and the dovetail groove section 172 are fitted to each other, since the tool part 200k can move with respect to the shank part 100k in the direction perpendicular to the axis of rotation 11 of the shank part 100k, the tool part 200k can be easily detached from the shank part 100k.

In addition, according to the embodiment, the tool part detachment screw hole section 146 configured to attach the tool part detachment screw 602 by applying a force such that the tool part 200k slides with respect to the shank part 100k in the direction perpendicular to the axis of rotation 11 of the shank part 100k when the dovetail-shaped section 271 and the dovetail groove section 172 of the tool part 200k and the shank part 100k are fitted to each other and the lid section 500 is not fixed to the lid-attaching cutout 181 in which the tool part 200k and the shank part 100k come in contact with each other. Accordingly, as the tool part detachment screw 602 is attached to the tool part detachment screw hole section 146 and a force is applied by the tool part detachment screw 602 such that the tool part 200k slides with respect to the shank part 100k in the direction perpendicular to the axis of rotation 11 of the shank part 100k, even when the tool part 200k is hard to remove, the shank part 100k can be more easily detached.

Further, the present invention is not limited to the embodiments but a detachment/attachment method may be modified in various forms, for example, by forming the tool part detachment screw hole section 146 as a through-hole with no groove, forming a screw hole section in the tool part and screwing the screw thereinto to fix the dovetail-shaped section 271, and so on.

INDUSTRIAL APPLICABILITY

According to the tool for friction stir welding of the one aspect and the other aspects of the present invention, fixation between the tool part and the shank part can be prevented from being loosened, the tool part can be reliably prevented from falling out of the shank part, and the tool part can be easily detached from the shank part.

REFERENCE SIGNS LIST 10a to 10k . . . tool for friction stir welding; 11 . . . axis of rotation; 100a to 100k . . . shank part; 111 . . . hexagonal frustum-shaped convex section; 112 . . . conical frustum convex section; 121 . . . hexagonal frustum-shaped concave section; 122 . . . conical frustum concave section; 124 . . . columnar concave section; 131 . . . key; 132 . . . key groove; 141 . . . hole section; 142 . . . increased hole diameter section; 144 . . . groove; 145 . . . lid-attaching screw hole section; 146 . . . tool part detachment screw hole section; 151 . . . serrated shape; 153 . . . vertical surface; 161 . . .

serrated convex section; 163 . . . vertical surface; 172 . . . dovetail groove section; 181 . . . lid-attaching cutout; 200*a* to 200*k* . . . tool part; 201 . . . shoulder; 202 . . . probe; 205 . . . base section; 211 . . . hexagonal frustum-shaped convex section; 212 . . . conical frustum convex section; 213 . . . collar; 221 . . . hexagonal frustum-shaped concave section; 222 . . . conical frustum concave section; 231 . . . key; 232 . . . key groove; 241 . . . screw hole section; 244 . . . groove; 251 . . . serrated shape; 253 . . . vertical surface; 262 . . . serrated concave section; 263 . . . vertical surface; 271 . . . dovetail-shaped section; 300 . . . cap part; 301 . . . cap part inner surface; 302 . . . reduced diameter section; 400*e* to 400*j* . . . screw; 401 . . . screw head section; 402 . . . screw front end portion; 404 . . . groove; 450*e*, 450*j* . . . tool part detachment screw; 451 . . . screw head section; 452 . . . screw front end portion; 454 . . . groove; 460 . . . nut; 500 . . . lid section; 501 . . . screw hole section; 601 . . . lid section attachment screw; 602 . . . tool part detachment screw.

The invention claimed is:

1. A tool for friction stir welding comprising:
    a tool part abutting a workpiece while being rotated;
    a shank part configured to fix the tool part to a front end of the shank part and be rotated together with the tool part; and
    a sliding restriction lid restricting slide movement of the tool part in a direction perpendicular to the axis of rotation of the shank part,
    wherein a portion of the tool part that comes in contact with the shank part has a dovetail-shaped section protruding in a trapezoidal shape and a portion of the shank part that comes in contact with the tool part has a dovetail groove section recessed in a trapezoidal shape, the dovetail-shaped section protruding in a trapezoidal shape and the dovetail groove section recessed in a trapezoidal shape enabling slide movement of the tool part with respect to the shank part in the direction perpendicular to the axis of rotation of the shank part while movement of the tool part with respect to the shank part in a direction parallel to the axis of rotation of the shank part is restricted by the dovetail-shaped section and the dovetail groove section of the tool part and the shank part being fitted to each other,
    the dovetail-shaped section extends in the direction perpendicular to the axis of rotation of the shank part,
    in the direction perpendicular to the axis of rotation of the shank part, an end of the dovetail groove section is opened in an outer periphery direction of the shank part and another end of the dovetail groove section terminates at an inside of the shank part, and
    the dovetail-shaped section is inserted into the dovetail groove section until the dovetail-shaped section abuts the another end of the dovetail groove section that terminates at the inside of the shank part, and, after the inserting, the tool part is fixed to the front end of the shank part so as to restrict slide movement of the tool part with respect to the shank part in the direction of the end of the dovetail groove section that is opened in the outer periphery direction of the shank part, by the sliding restriction lid being fixed to the shank part.

2. The tool for friction stir welding according to claim 1, further comprising a detachment member receiving section capable of having attached thereto a detachment member for applying a force such that the tool part slides with respect to the shank part in the direction of the end of the dovetail groove section that is opened in the outer periphery direction of the shank part when the dovetail-shaped section and the dovetail groove section of the tool part and the shank part are fitted to each other and the sliding restriction lid is not fixed to the shank part.

* * * * *